United States Patent
Furukawa et al.

[11] Patent Number: 6,044,133
[45] Date of Patent: Mar. 28, 2000

[54] COMMUNICATION SUPPORT SYSTEM FOR PROVIDING TELEPHONE SERVICES OF A DATA PROCESSING DEVICE BY A VOICE COMMAND SENT BY A TELEPHONE UNIT

[75] Inventors: Kimikazu Furukawa; Tomoyoshi Takebayashi; Toshihiro Azami; Katsutoshi Yano; Jun Kakuta; Yasuo Sato, all of Kawasaki, Japan

[73] Assignee: Fujitsu Limited, Kawasaki, Japan

[21] Appl. No.: 09/046,544

[22] Filed: Mar. 24, 1998

[30] Foreign Application Priority Data

Sep. 19, 1997 [JP] Japan ................................ 9-255795

[51] Int. Cl.[7] ............................... H04M 1/64; H04M 3/42
[52] U.S. Cl. ................................... 379/88.01; 379/88.02; 379/207; 379/212; 379/88.04
[58] Field of Search ................................. 379/88.01, 201, 379/212, 377, 283, 88.02, 88.03, 88.04

[56] References Cited

U.S. PATENT DOCUMENTS

| | | | |
|---|---|---|---|
| 4,827,500 | 5/1989 | Binkerd et al. | 379/88.01 |
| 5,315,649 | 5/1994 | Foster et al. | 379/355 |
| 5,594,784 | 1/1997 | Velius | 379/88.02 |

FOREIGN PATENT DOCUMENTS

| | | |
|---|---|---|
| 56-064587 | 6/1981 | Japan . |
| 58-108849 | 6/1983 | Japan . |
| 4-061543 | 2/1992 | Japan . |
| 5-056190 | 3/1993 | Japan . |
| 5-075823 | 3/1993 | Japan . |
| 8-030352 | 2/1996 | Japan . |
| 8-237299 | 9/1996 | Japan . |
| 9-116940 | 5/1997 | Japan . |

*Primary Examiner*—Daniel S. Hunter
*Assistant Examiner*—David Hyynh
*Attorney, Agent, or Firm*—Staas & Halsey LLP

[57] ABSTRACT

A communication support system includes a predetermined signal detection unit which detects a predetermined signal sent by a telephone unit when a telephone call between the telephone unit and a telephone network is in progress. A telephone condition detection unit detects a condition of the telephone unit. A line unit disconnects the telephone unit from the telephone network and connects the telephone unit to a data processing device when the predetermined signal is detected. A voice recognition unit determines which of a plurality of telephone services is indicated by a voice command signal sent by the telephone unit when the telephone unit is disconnected from the telephone network and connected to the data processing device. A telephone service processing unit executes a telephone service processing for the telephone service determined by the voice recognition unit, the telephone service processing unit starting execution of the telephone service processing in response to control data sent by the voice recognition unit.

15 Claims, 19 Drawing Sheets

| TELEPHONE SERVICES | VOICE COMMANDS (IN JAPANESE) |
|---|---|
| RECORDING START | "ROKUON" |
| RECORDING END | "TEISHI" |
| PLAYBACK START | "SAISEI" |
| PLAYBACK END | "TEISHI" |
| FILE TRANSMISSION START | "TENSO" |
| FILE TRANSMISSION END | "TEISHI" |
| TELEPHONE NUMBER ENTRY | "DENWACHO" |

COMMUNICATION SUPPORT SYSTEM FOR PROVIDING TELEPHONE SERVICES OF A DATA PROCESSING DEVICE BY A VOICE COMMAND SENT BY A TELEPHONE UNIT

BACKGROUND OF THE INVENTION (1) Field of the Invention

The present invention relates to a communication support system in which a telephone unit is connected through a communication control device to a data processing device and the communication control device is connected to a telephone network in order to provide computer-assisted telephone services for a user of the telephone unit when the user remotely controls the data processing device by transmitting a DTMF signal and a voice command signal from the telephone unit. Further, the present invention relates to a computer readable medium which stores program code instructions for causing a processor to execute a telephone service processing in response to a voice command signal from a telephone unit.

Personal computers for home use are becoming widespread. Modems have now shrunk to chip size, enhancing the popularity in personal computers. The increasing prevalence of personal computers having a built-in modem makes it easier to access the Internet or other communication networks through telephone lines. In recent years, the telephone lines are shared by the computers and the-telephones.

In recent developments, there is a demand for a useful, advanced communication support system which enables a telephone user to use a telephone unit to remotely control the data processing device in order to obtain computer-assisted telephone services. Currently, the computer-assisted telephone services are provided only by locally operating the data processing device, and the telephones and the computers are separately used. Further, it is desired to provide a communication support system which allows the telephone user to easily transmit data to or receive data from other communication media.

(2) Description of the Related Art

A conventional communication support system which provides existing telephone services by executing an application program installed in the system is known. The conventional communication support system provides the telephone services only when the user locally operates an input device (such as a keyboard or a mouse) of a personal computer. That is, when one of the telephone services is obtained from the conventional communication support system, the user must be located in front of the personal computer and locally operate the input device of the personal computer.

FIG. 21 shows such a conventional communication support system.

As shown in FIG. 21, the conventional communication support system generally has an existing telephone unit 401, a data processing device 404, and a line unit 403. The telephone unit 401 is connected through the line unit 403 to the data processing device 404, and the line unit 403 is connected to a telephone network 402. The data processing device 404 is, for example, a personal computer. The telephone network 402 is, for example, a public switched telephone network.

In the above-described conventional system, a voice input/output unit 405, a dialing unit 406 and a signal detection unit 407 are connected to the line unit 403. Further, a personal-computer (PC) interface unit 408 is provided between the data processing device 404 and the units 405 and 406.

The voice input/output unit 405 supplies a voice signal sent from the telephone unit 401 or the telephone network 402, to the data processing device 404 via the PC interface unit 408, and supplies a voice signal derived from digital data stored in the data processing device 404, to the telephone unit 401 or the telephone network 402. The dialing unit 406 provides an existing dialing function to transmit a call over the telephone network 402 to a destination terminal according to a telephone number input by an input device (such as a keyboard or a mouse) of the data processing device 404. The signal detection unit 407 detects various signals sent from a telephone line, such as a busy tone signal, a ring tone signal, a ring back tone signal, an on-hook signal, and an off-hook signal.

In the above-described conventional system, the telephone services are provided by executing an existing telephone-service application program on the data processing device (or the personal computer). Such telephone services include, for example, voice recording and playback, file transmission, and telephone number entry.

In the above-described conventional system, when a user in front of the data processing device 404 makes a call to the destination terminal, the application program installed in the data processing device 404 is executed. The user inputs a telephone number of the destination terminal and presses a dialing button on a monitor of the data processing device 404 by operating the input device (such as the keyboard or the mouse) of the data processing device 404. In this case, the user lifts a handset of the telephone unit 401 located away from the data processing device 404, and then the off-hook signal is detected by the signal detection unit 407. The telephone unit 401 is connected to the telephone network 402 by the line unit 403, and this enables the user to communicate with a person at the destination terminal during the telephone call.

However, in the above-described conventional system, it is impossible for the user of the telephone unit 401 to make a call to the destination terminal by using the telephone unit 401 to remotely control the application program on the data processing device 404.

In the above-described conventional system, when a voice recording function, as one of the telephone services, is obtained by executing the application program on the data processing device 404, the user of the data processing device 404 presses a recording start button on the monitor by operating the input device of the data processing device 404. In this case, the data processing device 404 acquires voice data from the telephone unit 401 or the telephone network 402 through the voice input/output unit 405. The application program on the data processing device 404 converts the voice data into digital data in a computer-readable format and stores the digital data in a memory of the data processing device 404. The application program continues to provide the voice recording until a recording end button on the monitor is pressed by the user.

However, in the above-described conventional system, it is impossible for the user of the telephone unit 401 to start the voice recording processing by using the telephone unit 401 to remotely control the application program on the data processing device 404.

In the above-described conventional system, when a playback function, as one of the telephone services, is obtained by executing the application program on the data processing device 404, the user of the data processing device 404 presses a playback start button on the monitor by operating the input device. In this case, the application program on the data processing device 404 converts the digital data stored in the memory of the device 404 into voice data, and supplies the voice data to the voice input/output unit 405. A voice signal is derived from the voice data by the voice input/output unit 405, and the voice signal is supplied to the telephone unit 401 or the telephone network 402 via the line unit 403.

The application program continues to provide the playback function until a playback end button on the monitor is pressed by the user or the end of the data stored in the memory is detected.

However, in the above-described conventional system, it is impossible for the user of the telephone unit 401 to start the playback processing by using the telephone unit 401 to remotely control the application program on the data processing device 404.

Further, in the above-described conventional system, when a telephone number entry function, as one of the telephone services, is obtained by executing the application program on the data processing device 404, the user of the data processing device 404 inputs a telephone number by operating the input device. In this case, the application program on the data processing device 404 stores the input telephone number in the memory. The application program is executed to carry out the telephone number entry processing when the user operates the keyboard or the mouse in connection with the monitor in an interactive manner.

However, in the above-described conventional system, it is impossible for the user of the telephone unit 401 to start the telephone number entry processing by using the telephone unit 401 to remotely control the application program on the data processing device 404. It is impossible for the conventional system to detect a telephone number input by the telephone unit 401.

SUMMARY OF THE INVENTION

An object of the present invention is to provide an improved communication support system in which the above-mentioned problems are eliminated.

Another object of the present invention is to provide a communication support system which enables the telephone user to use the telephone unit to obtain telephone services by remotely controlling the data processing device using a voice command signal sent by the telephone unit.

Still another object of the present invention is to provide a communication control device for a communication support system including a telephone unit and a data processing device, which enables the telephone user to use the telephone unit to obtain telephone services by remotely controlling the data processing device using a voice command signal sent by the telephone unit.

A further object of the present invention is to provide a method of executing a telephone service processing in a communication support system which provides telephone services for the telephone user of the telephone unit when the user remotely controls the data processing device using a voice command signal sent by the telephone unit.

Another object of the present invention is to provide a computer readable medium storing program code instructions which causes a processor of a communication support system to execute a telephone service processing in response to a voice command signal sent by a telephone unit.

The above-mentioned objects of the present invention are achieved by a communication support system in which a telephone unit is connected through a communication control device to a data processing device, the communication control device being connected to a telephone network, the communication support system comprising: a predetermined signal detection unit which detects a predetermined signal sent by the telephone unit when a telephone call between the telephone unit and the telephone network is in progress; a telephone condition detection unit which detects a condition of the telephone unit; a line unit which disconnects the telephone unit from the telephone network and connects the telephone unit to the data processing device when the predetermined signal is detected by the predetermined signal detection unit; a voice recognition unit which determines which of a plurality of telephone services is indicated by a voice command signal sent by the telephone unit when the telephone unit is disconnected from the telephone network and connected to the data processing device by the line unit; and a telephone service processing unit which executes a telephone service processing for the telephone service determined by the voice recognition unit, the telephone service processing unit starting execution of the telephone service processing in response to control data sent by the voice recognition unit.

The above-mentioned objects of the present invention are achieved by a communication control device for a communication support system including a telephone unit and a data processing device wherein the telephone unit is connected through the communication control device to a telephone network and the communication control device is connected to the telephone network, the communication control device comprising: a predetermined signal detection unit which detects a predetermined signal sent by the telephone unit when a telephone call between the telephone unit and the telephone network is in progress; a telephone condition detection unit which detects a condition of the telephone unit; and a line unit which disconnects the telephone unit from the telephone network and connects the telephone unit to the data processing device when the predetermined signal is detected by the predetermined signal detection unit, wherein a voice command signal sent by the telephone unit when the telephone unit is disconnected from the telephone network and connected to the data processing device is transmitted to the data processing device through the line unit, so that the data processing device executes a telephone service processing for a telephone service indicated by the voice command signal.

The above-mentioned objects of the present invention are achieved by a method of executing a telephone service processing in a communication support system wherein a telephone unit is connected through a communication control device to a data processing device and the communication control device is connected to a telephone network, the method comprising the steps of: detecting a predetermined signal sent by the telephone unit when a telephone call between the telephone unit and the telephone network is in progress; detecting a condition of the telephone unit; disconnecting the telephone unit from the telephone network and connecting the telephone unit to the data processing device when the predetermined signal is detected; determining which of a plurality of telephone services is indicated by a voice command signal sent by the telephone unit when the telephone unit is disconnected from the telephone network and connected to the data processing device; and executing a telephone service processing for the telephone service determined in the determining step in the data processing device.

In the communication support system of the present invention, it is possible to provide the computer-assisted telephone services for the telephone user when the telephone user uses the telephone unit to remotely control the data processing device using a voice command signal sent by the telephone unit. The data processing device includes the voice recognition unit which determines which of the plurality of telephone services is indicated by the voice command signal. The communication support system allows the telephone user to more easily transmit data to or receive data from other communication media such as the data processing device.

In the communication support system of the present invention, the line unit disconnects the telephone unit from the telephone network and connects the telephone unit to the data processing device when the predetermined signal from the telephone unit is detected during a telephone call, and it is possible to prevent a person at a destination telephone in the telephone network from hearing the voice of the telephone user when inputting the voice command.

Further, the communication support system of the present invention allows the telephone user to use a cordless telephone to remotely control the data processing device using a voice command signal sent by the cordless telephone. It is no longer necessary that the user be located in front of the data processing device when obtaining the computer-assisted telephone services from the communication support system.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the communication support system of the present invention with reference to the accompanying drawings.

Figure 1:
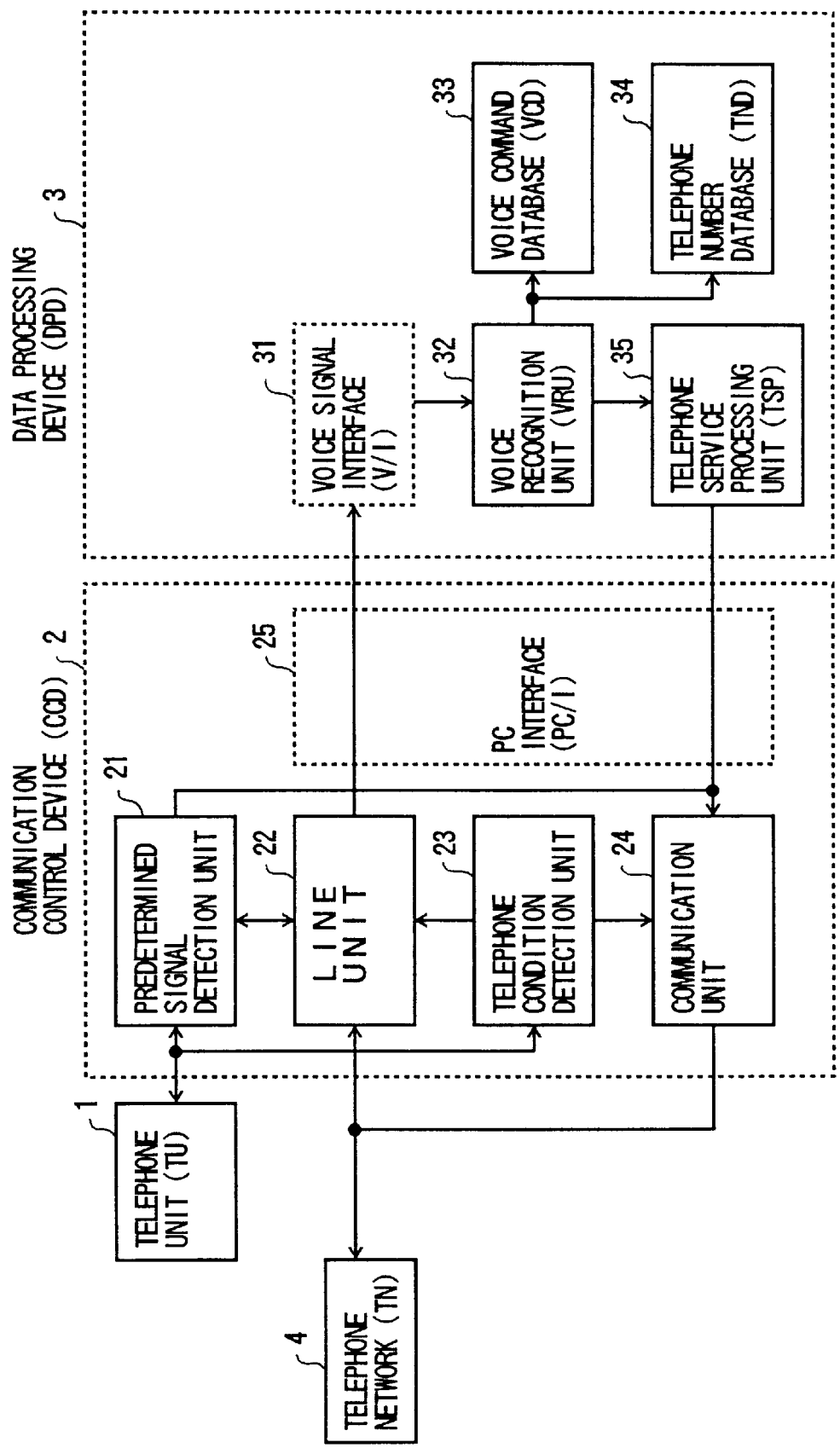
FIG. 1 is a block diagram of a communication support system of the present invention.

FIG. 1 shows a communication support system of the present invention.

As shown in FIG. 1, the communication support system generally has a telephone unit (TU) 1, a communication control device (CCD) 2, a data processing device (DPD) 3, and a telephone network (TN) 4. The telephone unit 1 is connected through the communication control device 2 to the data processing device 3, and the communication control device 2 is connected to the telephone network 4. In the communication support system of the present invention, the data processing device (DPD) 3 is remotely controlled by a voice command signal sent by the telephone unit (TU) 1, in order to provide one of a plurality of telephone services for a telephone user of the TU 1.

The telephone unit 1 provides existing voice transmission and reception functions and an existing dialing function.

The communication control device (CCD) 2 comprises a predetermined signal detection unit 21, a line unit 22, a telephone condition detection unit 23, a communication unit 24, and a personal-computer (PC) interface (PC/I) 25. The communication control device (CCD) 2 provides connection of the telephone unit 1 to the telephone network 4 and connection of the data processing device 3 to the telephone network 4.

In the communication control device (CCD) 2, the predetermined signal detection unit 21 provides detection of a predetermined signal sent by the telephone unit (TU) 1 when a telephone call between the TU 1 and the TN 4 is in progress. The telephone condition detection unit 23 provides detection of various signals sent from or to the telephone line (the TU 1 and the TN 4), the signals including a busy-tone signal, a ring tone signal, a ring-back-tone signal, an on-hook signal, and an off-hook signal. The communication unit 24 provides execution of a dialing processing of the CCD 2 when the communication unit 24 is controlled by a dialing command from the data processing device (DPD) 3. The PC interface 25 provides an interface of a voice signal and control data between the CCD 2 and the DPD 3.

In the communication control device (CCD) 2, the line unit 22 provides either connection between the TU 1 and the DPD 3 or connection between the TU 1 and the TN 4. When a telephone call between the TU 1 and the TN 4 is in progress and the predetermined signal from the TU 1 is detected, the line unit 22 connects the connection line from the TU 1 to the DPD 3 so that the TU 1 is connected to the DPD 3 through the line unit 22. Also, when the telephone call is not in progress and the off-hook signal from the TU 1 is detected, the line unit 22 connects the connection line from the TU 1 to the DPD 3 so that the TU 1 is connected to the DPD 3 through the line unit 22. Otherwise the line unit 22 connects the connection line from the TU 1 to the TN 4 so that the TU 1 is connected to the TN 4 through the line unit 22.

In the communication support system of FIG. 1, the data processing device (DPD) 3 comprises a voice signal interface (V/I) 31, a voice recognition unit (VRU) 32, a voice command database 33, a telephone number database 34, and a.telephone service processing unit (TSP) 35. The voice signal interface 31 provides reception of a voice signal sent by the TU 1 through the CCD 2. The voice recognition unit (VRU) 32 determines which of a plurality of telephone services is indicated by a voice command signal sent by the telephone unit 1. The voice command database 33 is stored in the DPD 3 and provides a plurality of voice commands related to the telephone services for the voice recognition unit (VRU) 32. The telephone number database 34 is stored in the DPD 3 and provides a plurality of telephone number data related to telephone numbers of destination telephones in the TN 4 for the voice recognition unit (VRU) 32. The telephone service processing unit (TSP) 35 executes a telephone service processing for the telephone service determined by the voice recognition unit (VRU) 32. The TSP 35 starts execution of the telephone service processing in response to control data from the VRU 32. The DPD 3 provides execution of a telephone-service processing program in accordance with the voice command signal sent by the TU 1.

In the communication support system of FIG. 1, when a telephone call is not in progress and the off-hook signal from the TU 1 is detected by the telephone condition detection unit 23, the line unit 22 connects the connection line from the TU 1 to the V/I 31 of the DPD 3 so that the TU 1 is connected to the DPD 3 and disconnected from the TN 4. At this time, the user of the TU 1 pronouces a calling ID (a telephone number or a name of a person) for a destination telephone in the TN 4 into the handset of the TU 1. As a result, a voice signal indicating the pronounced calling ID is transmitted from the TU 1 to the V/I 31 of the DPD 3 via the CCD 2.

When the voice signal (the pronounced calling ID) from the TU 1 corresponds to one of the plurality of telephone number data from the telephone number database 34, the voice recognition unit (VRU) 32 determines a corresponding telephone number for the destination telephone. The voice recognition unit (VRU) 32 supplies to the telephone service processing unit (TSP) 35 the pronounced calling ID from the TU 1 and a dialing command from the voice command database 33.

The telephone service processing unit (TSP) 35 executes a dialing processing so that the communication unit 24 of the CCD 2 is controlled by the dialing command from the DPD 3 so as to send a call to the destination telephone in the TN 4 in accordance with the dialing command and the pronounced calling ID. When the dialing processing is finished, the line unit 202 disconnects the DPD 3 from the connection line from the TU 1 and connects the TU 1 to the TN 4 via the line unit 22. The user of the TU 1 then starts conversation with the person at the destination telephone in the TN 4.

Accordingly, in the communication support system of FIG. 1, when the telephone call is not in progress and the off-hook signal from the TU 1 is detected, the dialing processing to send a call to the destination telephone in the TN 4 is automatically executed by transmitting the voice signal (the pronounced calling ID) from the TU 1 to the DPD 3.

In the communication support system of FIG. 1, when a telephone call is in progress, the predetermined signal detection unit 21 provides detection of the predetermined signal sent by the TU 1. The user of the TU 1 inputs, when necessary, a predetermined DTMF signal by operating the ten-key pad of the TU 1 during the telephone call. The DTMF signal from the TU 1 is detected by the predetermined signal detection unit 21 in the CCD 2.

In a case in which a predetermined dial-pulse signal is used for the TU 1 to transmit the predetermined signal, it is necessary that a dial-pulse detection unit which detects the predetermined dial-pulse signal from the TU 1 be substituted for the predetermined signal detection unit 21 in the CCD 2.

When the predetermined signal from the TU 1 is detected by the predetermined signal detection unit 21, the line unit 22 is controlled to connect the connection line from the TU 1 to the V/I 31 of the DPD 3 and disconnect the TU 1 from the TN 4. As the connection between the TU 1 and the DPD 3 is established, the voice recognition unit (VRU) 32 provides recognition of a voice command signal sent by the TU 1.

Figures 2, 3:
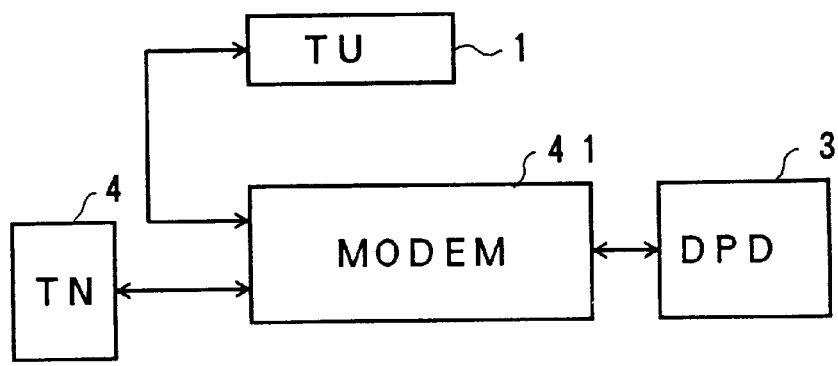
FIG. 2 is a diagram for explaining allocation of specified voice commands to telephone services.
FIG. 3 is a diagram for explaining a construction of elements of the communication support system.

The user of the TU 1 inputs a voice command that is one of the voice commands shown in FIG. 2 by pronouncing into the handset of the TU 101. The voice command signal from the TU 1 is transmitted to the V/I 31 of the DPD 3 via the CCD 2. When the voice command signal from the TU 1 corresponds to one of the plurality of voice commands from the voice command database 33, the voice recognition unit (VRU) 32 determines a corresponding telephone service for the voice command signal. At this time, control data from the VRU 32 is sent to the telephone service processing unit (TSP) 35, and the TSP 35 starts execution of a telephone service processing for the telephone service determined by the voice recognition unit (VRU) 32. Therefore, one of the telephone services, including the voice recording and playback, file transmission and telephone number entry, is provided by the DPD 3 based on the voice command signal sent by the TU 1.

For example, when the user of the TU 1 inputs the voice command "rokuon" (or the word "record" in Japanese), the telephone service processing unit (TSP) 35 executes a voice recording start processing for the telephone service determined based on the voice command signal sent by the TU 1.

Accordingly, in the communication support system of FIG. 1, the voice recognition unit (VRU) 32 determines which of the plurality of telephone services is indicated by the voice command signal from the TU 1, and the telephone service processing unit (TSP) 35 executes a telephone service processing for the telephone service determined by the VRU 32. The telephone service processing executed by the TSP 35 corresponds to one of the voice recording and playback, the file transmission and the telephone number entry as shown in FIG. 2. In the communication support system of FIG. 1, it is possible to provide the telephone services for the user of the TU 1 when the user uses the TU 1 to remotely control the DPD 3. The communication support system allows the telephone user to more easily transmit data to or receive data from other communication media such as a personal computer. Further, the communication support system allows the user to use a cordless telephone to remotely control the DPD 3. It is no longer necessary that the user be located in front of the DPD 3 when obtaining the telephone services from the communication support system.

FIG. 2 shows allocation of specified voice commands to a plurality of telephone services. In the communication support system of FIG. 1, a voice command signal indicating one of the telephone services shown in FIG. 2 is transmitted to the DPD 3 by the telephone unit 1. The plurality of telephone services are provided by the DPD 3 and includes, for example, voice recording and playback, file transmission and telephone number entry as shown in FIG. 2. However, the present invention is not limited to the types of telephone services of FIG. 2 and the types of voice commands indicated by the example of FIG. 2.

Alternatively, in a case in which a DTMF (dual-tone multiple frequency) pulse is used for the telephone unit 1 to transmit the command signal, specified values related to the ten-key pad (including "0" through "9" keys, "#" and "*" keys, and so on) of the telephone unit 1 are allocated to a plurality of DTMF command signals. The plurality of DTMF command signals respectively corresponds to the plurality of telephone services.

Further, in a case in which a dial pulse is used for the telephone unit 1 to transmit the command signal, other specified values related to the telephone unit 1 may be allocated to a plurality of dial-pulse command signals. The plurality of dial-pulse command signals respectively correspond to the plurality of telephone services.

In the communication support system of FIG. 1, the voice recognition unit (VRU) 32 determines which of the plurality of telephone services as shown in FIG. 2 is indicated by the voice command signal from the TU 1 when the TU 1 is disconnected from the TN 4 and connected to the DPD 3. The telephone service processing unit (TSP) 35 executes a telephone service processing for the telephone service determined by the VRU 32, the TSP 35 starting execution of the telephone service processing in response to the control data sent by the VRU 32. Therefore, it is possible to provide telephone services, such as voice recording and playback, file transmission and telephone number entry, for the user of the TU 1 when the user uses the TU 1 to remotely control the DPD 3 using the voice command signal sent by the TU 1. The communication support system allows the telephone user to more easily transmit data to or receive data from other communication media such as the data processing device.

In the communication support system of FIG. 1, the line unit 22 disconnects the TU 1 from the TN 4 and connects the TU 1 to the DPD 3 when the telephone call is in progress and the predetermined signal from the TU 1 is detected. Therefore, it is possible to prevent a person of a destination telephone in the TN 4 from hearing the voice of the user of TU 1 when inputting the voice command.

Further, in the communication support system of FIG. 1, when the TU 1 starts a conversation with the destination telephone in the TN 4, the line unit 22 disconnects the DPD 3 from the connection line from the TU 1 and connects the TU 1 to the TN 4 via the line unit 22. Even when a voice command signal is erroneously sent by the TU 1 during the conversation, the recognition of the voice command signal is not performed by the VRU 32 in the DPD 3 during the conversation. It is possible to avoid erroneous execution of the recognition of the voice command signal.

The communication control device 2 in the communication support system of the present invention, as shown in FIG. 1, may be considered a modem or a terminal adapter that connects both the telephone unit 1 and the data processing device 3 to the telephone network 4. FIG. 3 through FIG. 7 show various examples of construction of the elements of the communication support system. In the examples of FIGS. 3–7, a modem, a telephone system with a built-in modem, and a personal computer with a built-in telephone and modem are used to construct the communication support system of the present invention.

Figure 4:
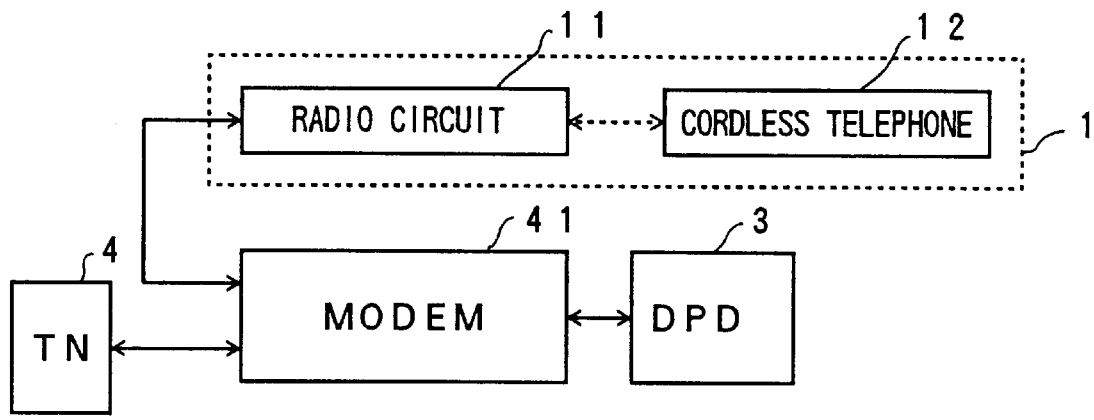
FIG. 4 is a diagram for explaining another construction of elements of the communication support system.

The examples of FIG. 3 and FIG. 4 are essentially the same as the construction of the elements of the communication support system shown in FIG. 1. In the examples of FIG. 3 and FIG. 4, a modem 41 is substituted for the communication control device (CCD) 2 in the communication support system of the present invention. In the example of FIG. 4, the telephone unit 1 includes a radio circuit 11 and a cordless telephone 12. The cordless telephone 12 provides existing radio signal transmission and reception functions at a remote location of the radio circuit 11. The radio circuit 11 provides conversion of a radio signal from the cordless telephone 12 into voice data and conversion of voice data from the telephone line into a radio signal.

Figure 5:
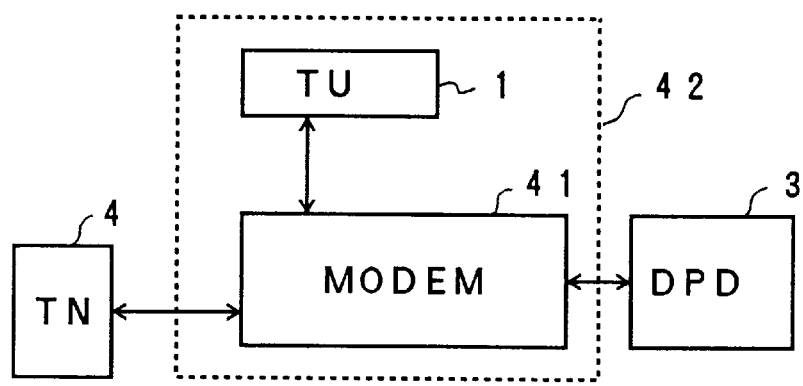
FIG. 5 is a diagram for explaining still another construction of elements of the communication support system.

The example of FIG. 5 utilizes a telephone system 42 having a built-in modem. In this example, the modem 41 contained in the telephone system 42 is substituted for the communication control device 2 in the communication support system of the present invention.

Figure 6:
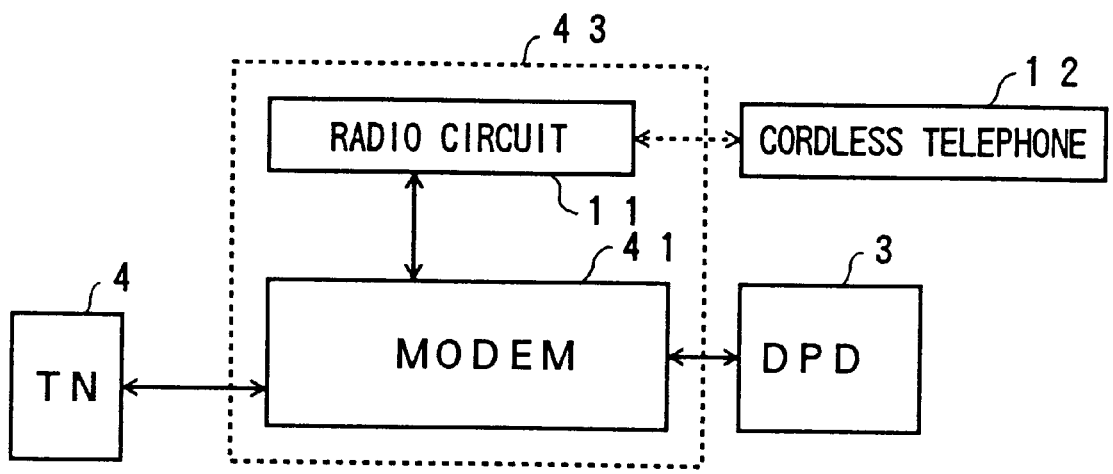
FIG. 6 is a diagram for explaining a further construction of elements of the communication support system.

The example of FIG. 6 utilizes a telephone system 43 having a built-in modem. In this example, the modem 41 contained in the telephone system 43 is substituted for the communication control device 2 in the communication support system of the present invention. The cordless telephone 12 provides the existing radio signal transmission and reception function at a remote location of the radio circuit 11. The radio circuit 11 contained in the telephone system 43 provides the conversion of a radio signal from the cordless telephone 12 into voice data and the conversion of voice data from the telephone line into a radio signal.

Figure 7:
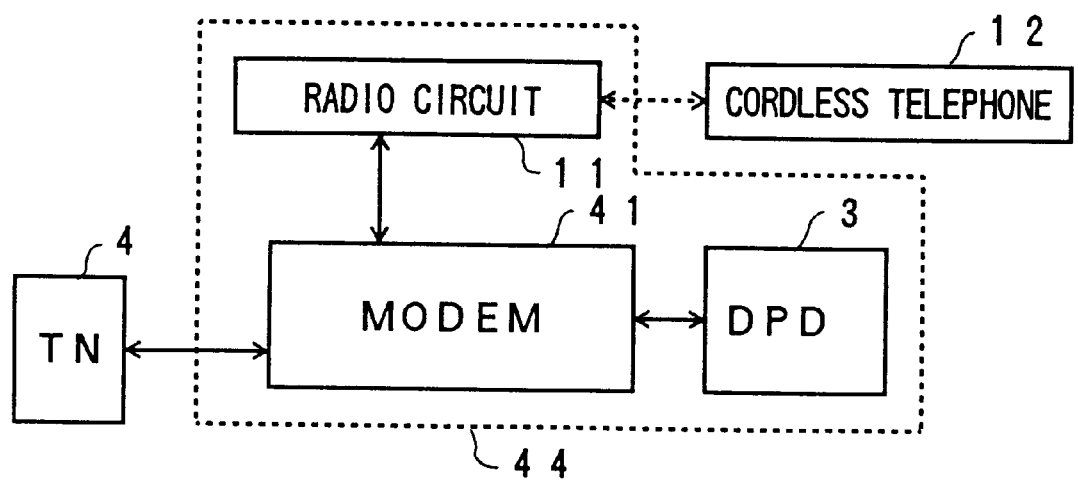
FIG. 7 is a diagram for explaining another construction of elements of the communication support system.

The example of FIG. 7 utilizes a personal computer 44 having a built-in telephone and modem. In this example, the modem 41 and the data processing device 3 contained in the personal computer 44 are substituted for the communication control device 2 and the data processing device 3 in the communication support system of the present invention. The cordless telephone 12 provides the existing radio signal transmission and reception function at a remote location of the radio circuit 11. The radio circuit 11 contained in the personal computer 44 provides the conversion of a radio signal from the cordless telephone 12 into voice data and the conversion of voice data from the telephone line into a radio signal.

Figure 8:
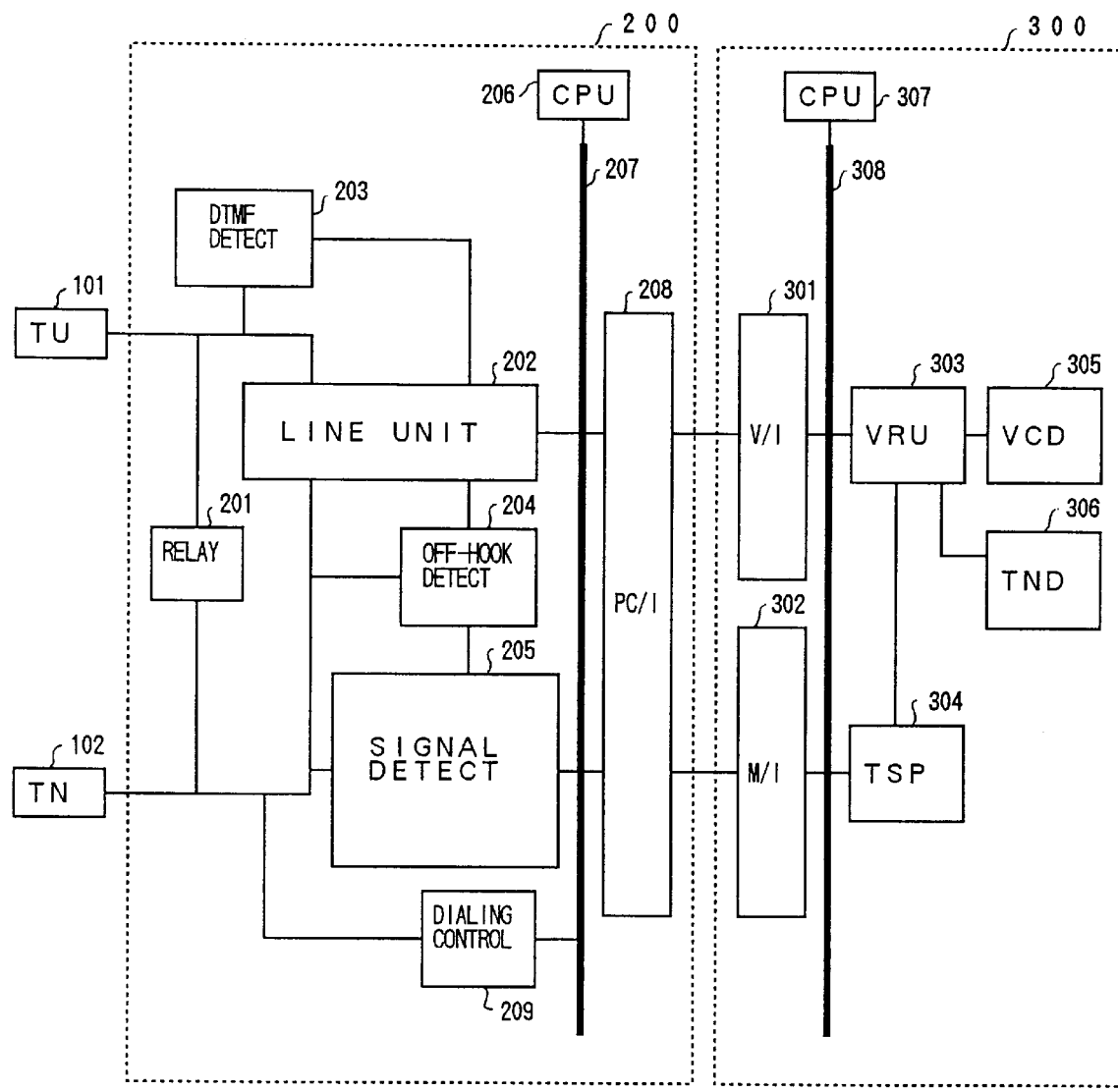
FIG. 8 is a block diagram of one embodiment of the communication support system of the present invention.

Next, FIG. 8 shows one embodiment of the communication support system of the present invention.

In the present embodiment, one of the telephone services, including the voice recording and playback, file transmission and telephone number entry, is provided when the user on the telephone unit 101 remotely controls the data processing device 300 by transmitting a predetermined command signal and a voice command signal from the telephone unit to the data processing device via the communication control device.

As shown in FIG. 8, the communication support system of the present embodiment generally has a telephone unit (TU) 101, a communication control device (CCD) 200, a data processing device (DPD) 300, and a telephone network (TN) 102. The TU 101 is connected through the CCD 200 to the DPD 300, and the CCD 200 is connected to the TN 102.

The CCD 200 in the present embodiment comprises a relay 201, a line unit 202, a DTMF detection unit 203, an off-hook detection unit 204, a signal detection unit 205, a central processing unit (CPU) 206, a bus 207, a personal-computer interface (PC/I) 208, and a dialing control unit 209. The DPD 300 in the present embodiment comprises a voice signal interface (V/I) 301, a modem interface (M/I) 302, a voice recognition unit (VRU) 303, a telephone service processing unit (TSP) 304, a voice command database (VCD) 305, a telephone number database (TND) 306, a central processing unit (CPU) 307, and a bus 308.

In the communication support system of FIG. 8, when a predetermined DTMF (dual-tone multiple frequency) signal from the TU 101 is detected by the DTMF detection unit 203 during a telephone call, a connection line from the TU 101 is connected to a connection line led to the V/I 301 of the DPD 300 by the line unit 202 so that the TU 101 is connected to the DPD 300 and disconnected from the TN 102. After such a connection is performed by the line unit 202, a voice command signal from the user of the TU 101 is transmitted to the DPD 300 through the line unit 202. In the DPD 300, the voice recognition unit (VRU) 303 determines which of the telephone services is indicated by the voice command signal from the TU 101. The telephone service processing unit (TSP) 304 executes a telephone service processing for the telephone service determined by the voice recognition unit (VRU) 303. Therefore, one of the telephone services, including the voice recording and playback, file transmission and telephone number entry, is provided by the DPD 300 based on the voice command signal from the TU 101.

In the communication support system of FIG. 8, the TU 101 provides the existing voice signal transmission and receiving functions and the existing dialing function. The DTMF signal used to control the line unit 202 and the voice command signal used to control the DPD 300 are transmitted by the TU 101. The TN 102 is, for example, a public switched telephone network.

In the CCD 200 of the present embodiment, the CPU 206 receives signals from the elements of the CCD 200 connected through the bus 207, and controls the elements of the CCD 200.

In the CCD 200 of the present embodiment, a telephone-service processing program related to the flowcharts of FIGS. 9–20 (which will be described later) is program code instructions stored in a memory (not shown) of the CCD 200. The memory of the CCD 200 is, for example, a ROM (read-only memory). The memory corresponds to a computer readable medium of the claims. The computer readable medium includes any one of instruction storage devices, such as, for example, magnetic disks including floppy disks, optical disks including CD-ROMs, magneto-optical disks including MOs, semiconductor memory cards such as PC cards and miniature cards, and other types of computer usable devices and media.

Further, in the present embodiment, the memory of the CCD 200 may store encoded or non-encoded instructions. The instructions may be installed from a floppy disk (or a CD-ROM) to a hard disk drive (not shown) of the CCD 200 first, transferred to a RAM (not shown) of the CCD 200 and then read by the CPU 206. The memory of the CCD 200 may store either all or a part of the instructions related to the flowcharts of FIGS. 9–20.

The relay 201 is controlled by the CPU 206 so that the relay 201 switches on or off the connection line between the TU 101 and the TN 102. In the present embodiment, when power is supplied to the CCD 200 so as to place the CCD 200 in an initial condition, the relay 201 is set in an off-state by the CPU 206 so that the TU 101 is disconnected from the TN 102. When power is not supplied to the CCD 200, the relay 201 is set in an on-state by the CPU 206 so that the TU 101 is connected to the TN 102 through the relay 201.

The line unit 202 provides either connection between the TU 101 and the DPD 300 or connection between the TU 101 and the TN 102. When a telephone call between the TU 101 and the TN 102 is in progress and the DTMF signal from the TU 101 is detected, the line unit 202 connects the connection line from the TU 101 to the V/I 301 of the DPD 300 so that the TU 101 is connected to the DPD 300 through the line unit 202. Also, when the telephone call is not in progress and the off-hook signal from the TU 101 is detected, the line unit 202 connects the connection line from the TU 101 to the V/I 301 of the DPD 300 so that the TU 101 is connected to the DPD 300 through the line unit 202. Otherwise the line unit 202 connects the connection line from the TU 101 to the TN 102 so that the TU 101 is connected to the TN 102 through the line unit 202.

The DTMF detection unit 203 provides detection of the DTMF signal sent by the TU 101. The DTMF detection unit 203 determines whether the DTMF signal from the TU 101 is sent to the CCD 200. The off-hook detection unit 204 provides detection of an off-hook signal sent by the TU 101. The off-hook detection unit 204 determines whether the TU 101 is in an off-hook condition.

The signal detection unit 205 provides detection of various signals sent from or to the telephone line (the TU 101 and the TN 102), the signals including a busy-tone signal, a ring tone signal, a ring-back-tone signal ("RBT"), and an on-hook signal. The busy-tone signal, when detected by the signal detection unit 205, indicates that a telephone call between the TU 101 and the TN 102 is in progress. The ring tone signal, when detected by the signal detection unit 205, indicates that a call from a telephone in the TN 102 is received by the TU 101. The ring-back-tone (RBT) signal, when detected by the signal detection unit 205, indicates that a telephone call from the TU 101 is received by a telephone in the TN 102.

The PC interface (PC/I) 208 provides an interface between the CCD 200 and the DPD 300. The PC interface 208 sends the voice command signal from the TU 101 to the DPD 300. The PC interface 208 provides communication between the CCD 200 and the DPD 300.

In the DPD 300 of the present embodiment, the CPU 307 receives signals from the elements of the DPD 300 connected through the bus 308, and controls the elements of the DPD 300.

The voice signal interface (V/I) 301 provides reception of a voice command signal sent by the TU 101. The voice recognition unit (VRU) 303 provides recognition of the voice command signal from the TU 101. The voice recognition unit 303 determines which of the telephone services is indicated by the voice command signal from the TU 101.

The telephone service processing unit (TSP) 304 executes a telephone service processing for the telephone service determined by the voice recognition unit 303.

The voice command database 305 is stored in the DPD 300 and provides a plurality of voice commands related to the telephone services for the VRU 303. When a voice command signal from the TU 101 corresponds to one of the plurality of voice commands from the voice command database 305, the voice recognition unit (VRU) 303 determines a corresponding telephone service for the voice command signal. The telephone number database 306 is stored in the DPD 300 and provides a plurality of telephone number data related to telephone numbers of destination telephones in the TN 102 for the VRU 303. When a voice signal from the TU 101 corresponds to one of the plurality of telephone number data from the telephone number database 306, the voice recognition unit 303 determines a corresponding telephone number for the voice signal (the pronounced calling ID), and the telephone number is used to execute a dialing processing.

In the communication support system of FIG. 8, when a telephone call is not in progress, the dialing processing to send a call to a destination telephone in the TN 102 is executed by transmitting a voice signal from the TU 101 to the DPD 300, as follows. It is assumed that power is supplied to the CCD 200 and the relay 201 is set in the off-state.

When a telephone call is not in progress and the off-hook signal from the TU 101 is detected by the off-hook detection unit 204, the line unit 202 connects the connection line from the TU 101 to the connection line led to the V/I 301 of the DPD 300 so that the TU 101 is connected to the DPD 300 and disconnected from the TN 102.

At this time, the user of the TU 101 pronounces a calling ID (a telephone number or a name of a person) for the destination telephone in the TN 102 into the handset of the TU 101. As a result, a voice signal indicating the pronounced calling ID is transmitted from the TU 101 to the V/I 301 of the DPD 300 via the CCD 200.

When the voice signal (the pronounced calling ID) from the TU 101 corresponds to one of the plurality of telephone number data from the telephone number database 306, the voice recognition unit (VRU) 303 determines a corresponding telephone number for the destination telephone. The voice recognition unit (VRU) 303 supplies to the telephone service processing unit (TSP) 304 the pronounced calling ID from the TU 101 and a dialing command from the voice command database 305.

The telephone service processing unit (TSP) 304 executes the dialing processing so that the dialing control unit 209 of the CCD 200 is controlled by the dialing command from the DPD 300 so as to send a call to the destination telephone in the TN 102 in accordance with the dialing command and the pronounced calling ID. When the dialing processing is finished, the line unit 202 disconnects the connection line led to the DPD 300 from the connection line from the TU 101 and connects the TU 101 to the TN 102 via the line unit 202.

Accordingly, in the communication support system of FIG. 8, when a telephone call is not in progress, the dialing processing to send a call to the destination telephone in the TN 102 is automatically executed by transmitting the voice signal (the pronounced calling ID for the destination telephone) from the TU 101 to the DPD 300.

In the communication support system of FIG. 8, when the TU 101 starts a conversation with the destination telephone in the TN 102, the line unit 202 disconnects the DPD 300 from the connection line from the TU 101 and connects the TU 101 to the TN 102 via the line unit 202. Thus, the voice recognition unit (VRU) 303 at this time does not provide recognition of the voice command signal from the TU 101. Even when a voice command signal is erroneously sent by the TU 101 during the conversation, the recognition of the voice command signal is not performed by the VRU 303 in the DPD 300 during the conversation. It is possible to avoid erroneous execution of the recognition of the voice command signal. Further, since the line unit 202 disconnects the TU 101 from the TN 102 and connects the TU 101 to the DPD 300 via the line unit 202 when the DTMF signal from the TU 101 is detected during a telephone call, and it is possible to prevent the person of the destination telephone from hearing the voice of the user of the TU 101 when inputting the voice command.

When a telephone call is in progress, the DTMF detection unit 203 provides detection of the DTMF signal on the connection line of the TU 101 and the TN 102. The user of the TU 101 inputs, when necessary, the DTMF signal by operating the ten-key pad of the TU 101 during the telephone call. The DTMF signal from the TU 101 is detected by the DTMF detection unit 203 in the CCD 200.

In the case in which a predetermined dial-pulse signal is used for the telephone unit 1 to transmit the command signal to the data processing device 3, it is necessary that a dial-pulse detection unit is substituted for the DTMF detection unit 203 in the CCD 200.

When the DTMF signal from the TU 101 is detected by the DTMF detection unit 203, the line unit 202 is controlled to connect the connection line from the TU 101 to the V/I 301 of the DPD 300 and disconnect the TU 101 from the TN 102. As the connection between the TU 101 and the DPD 300 is established, the voice recognition unit (VRU) 303 provides recognition of the voice command signal from the TU 101.

The user of the TU 101 inputs a voice command that is one of the voice commands shown in FIG. 2 by pronouncing into the handset of the TU 101. The voice command signal from the TU 101 is transmitted to the V/I 301 of the DPD 300 via the CCD 200. When the voice command signal from the TU 101 corresponds to one of the plurality of voice commands from the voice command database 305, the voice recognition unit (VRU) 303 determines a corresponding telephone service for the voice command signal. At this time, control data from the VRU 303 is sent to the telephone service processing unit (TSP) 304, and the TSP 304 starts execution of a telephone service processing for the telephone service determined by the voice recognition unit (VRU) 303. Therefore, one of the telephone services, including the voice recording and playback, file transmission and telephone number entry, is provided by the DPD 300 based on the voice command signal from the TU 101.

For example, when the user of the TU 101 inputs the voice command "rokuon" (or the word "record" in Japanese), the telephone service processing unit (TSP) 304 executes the voice recording start processing for the telephone service determined by the voice command from the TU 101.

Accordingly, in the communication support system of FIG. 8, the voice recognition unit (VRU) 303 determines which of the telephone services is indicated by the voice command signal from the TU 101, and the telephone service processing unit (TSP) 304 executes a telephone service processing for the telephone service determined by the voice recognition unit (VRU) 303, such as one of the telephone services including voice recording and playback, file transmission and telephone number entry as shown in FIG. 2. In the communication support system of the present embodiment, it is possible to provide the telephone services for the telephone user when the telephone user uses the telephone unit to remotely control the DPD 300. The communication support system of the present embodiment allows the telephone user to more easily transmit data to or receive data from other communication media such as the DPD 300. Further, the communication support system of FIGS. 4, 6 and 7 allows the telephone user to use the cordless telephone 12 to remotely control the DPD 300. It is no longer necessary that the user be located in front of the DPD 300 when obtaining the telephone services from the communication support system.

Figure 9:
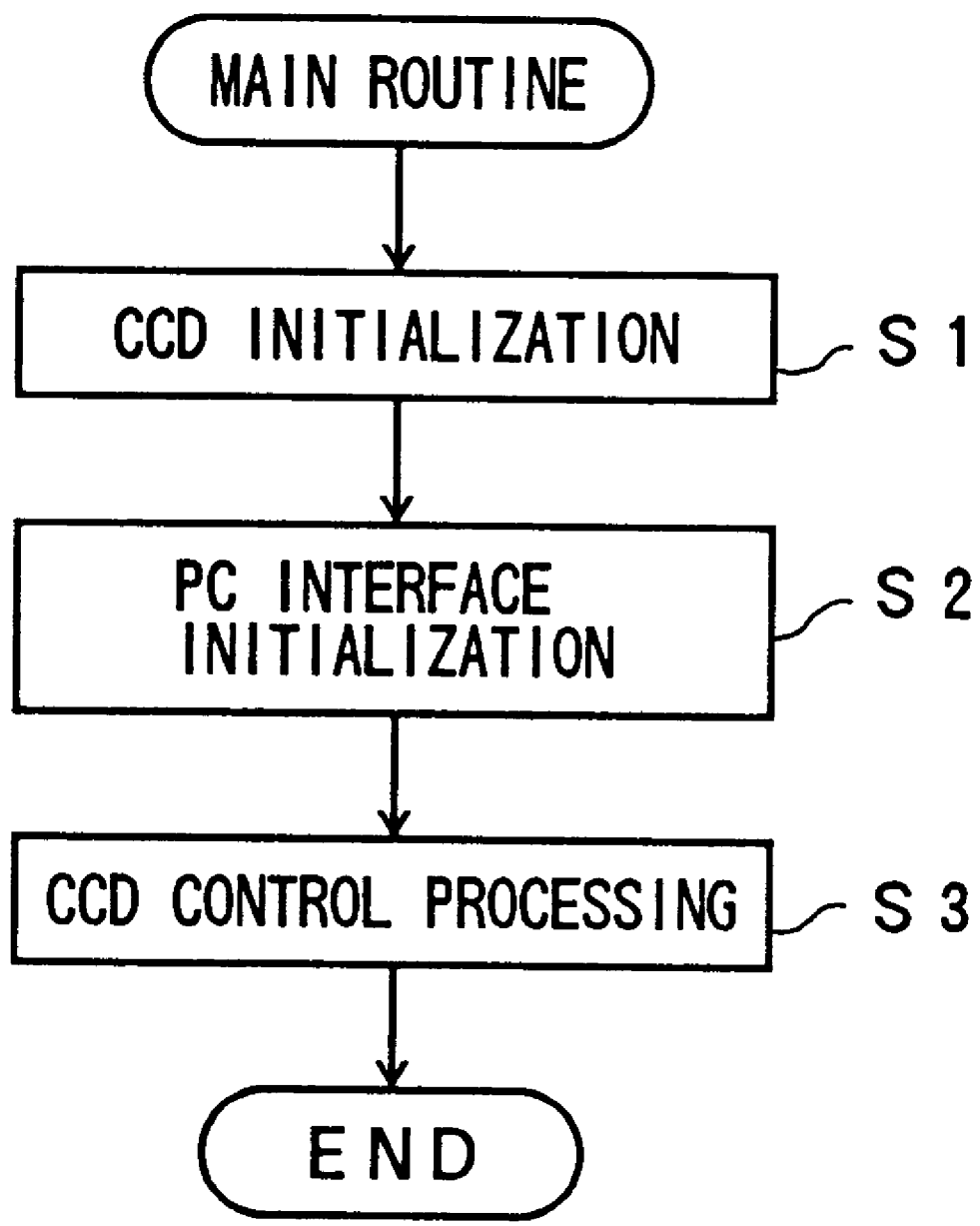
FIG. 9 is a flowchart for explaining a main routine of a telephone-service processing program executed by a CPU of a communication control device in the communication support system of FIG. 8.
Figure 10:
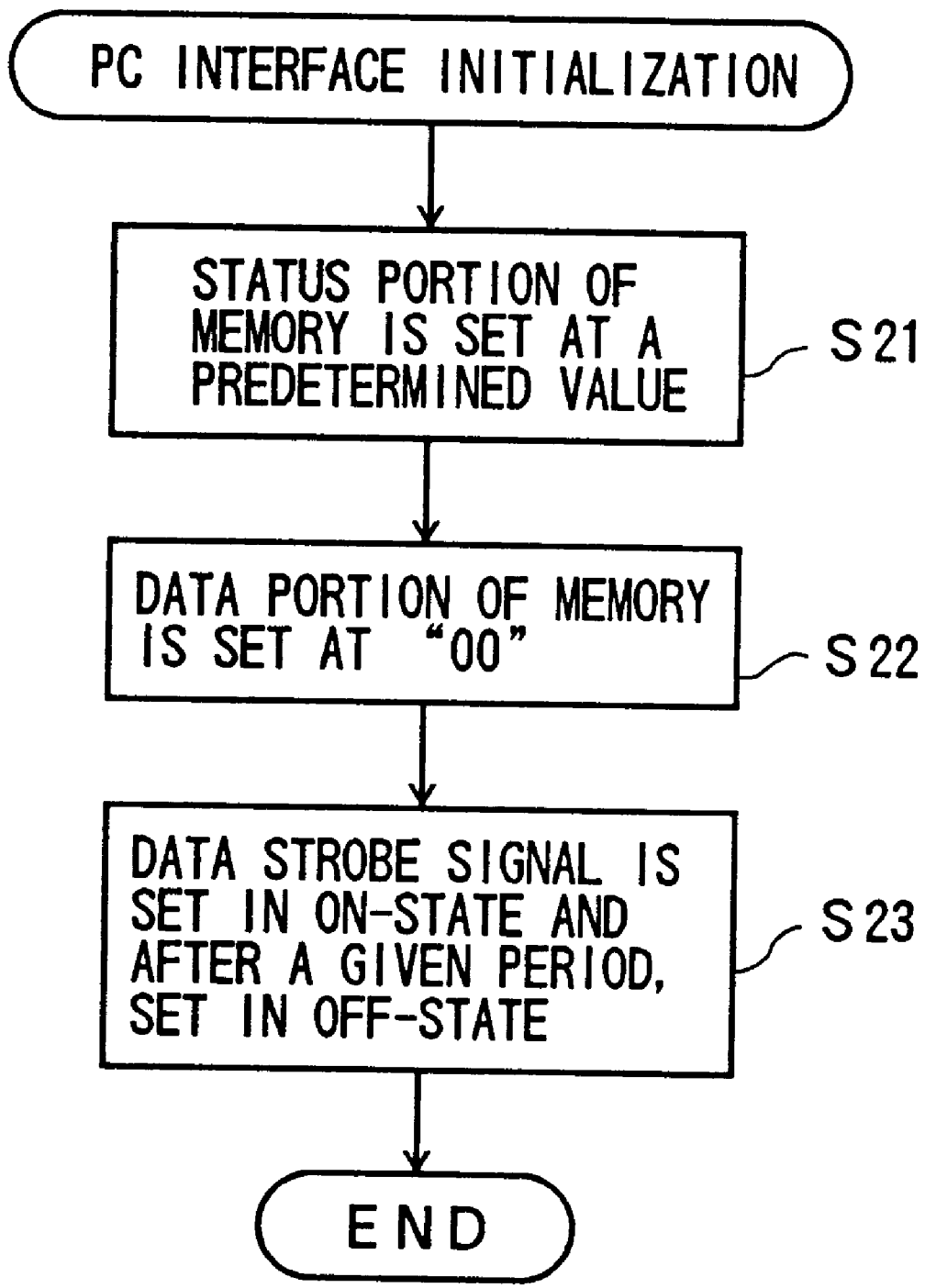
FIG. 10 is a flowchart for explaining a PC interface initialization in the main routine of FIG. 9.
Figure 11:
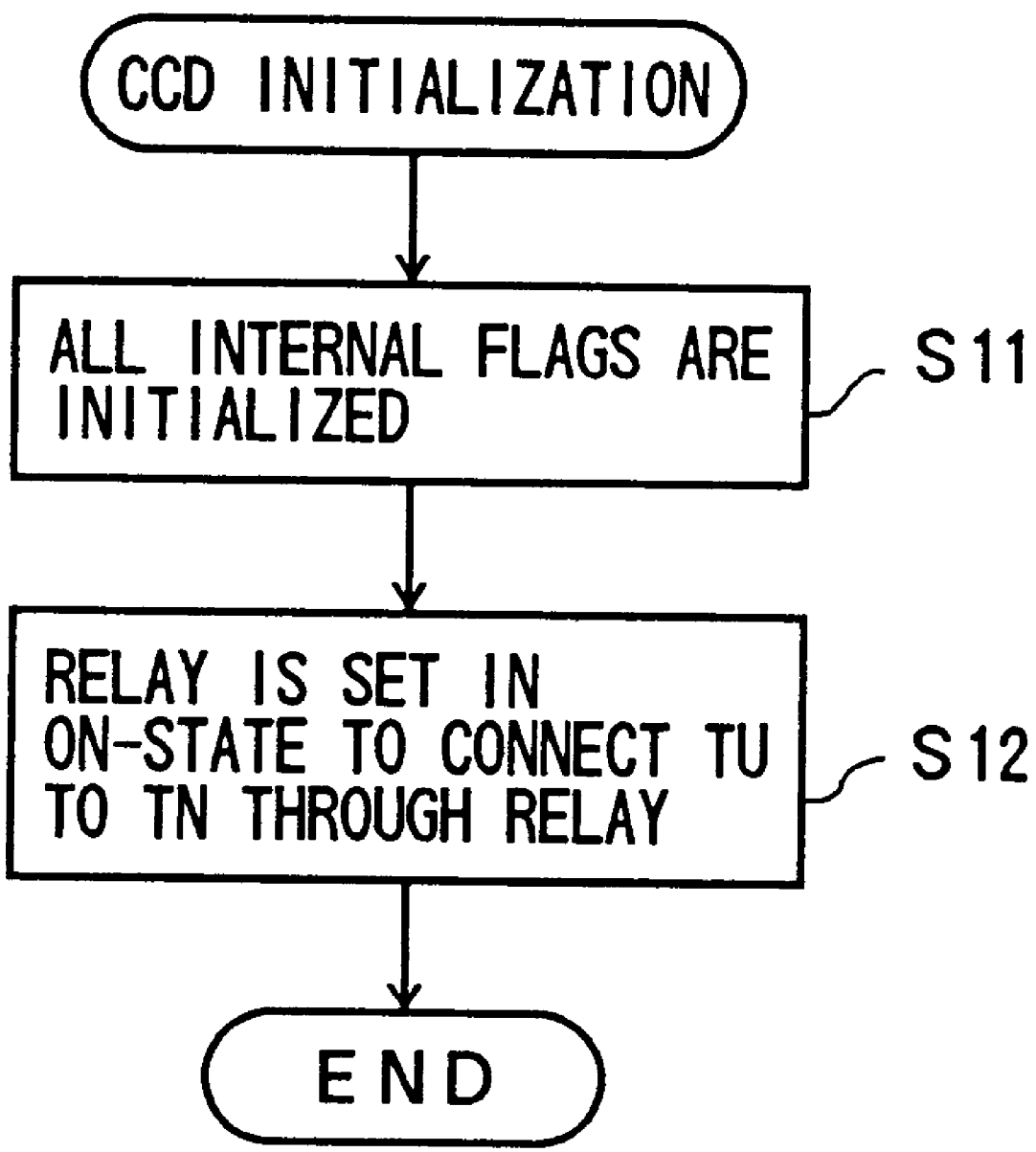
FIG. 11 is a flowchart for explaining a CCD initialization in the main routine of FIG. 9.

FIG. 9 shows a main routine of a telephone service processing program executed by the central processing unit (CPU) 206 of the communication control device (CCD) 200 of FIG. 8. FIG. 10 shows a PC interface initialization in the main routine of FIG. 9. FIG. 11 shows a CCD initialization in the main routine of FIG. 9.

When power is supplied to the CCD 200, the program code instructions stored in the memory of the CCD 200 cause the CPU 206 to perform an initialization of the CCD 200 (S1) as shown in FIG. 9. After the CCD initialization of the above Si is performed, the program code instructions cause the CPU 206 to perform an initialization of the PC interface 111 (S2). After the PC interface initialization of the above S2 is performed, the program code instructions cause the CPU 206 to perform a CCD control processing routine (S3) based on the DTMF signal and the voice command signal from the TU 101, which will be described later.

In the CCD 200 shown in FIG. 8, it is assumed that power is supplied to the CCD 200 to place the CCD 200 in the initial condition, and the relay 201 is set in the off-state so that the TU 101 is disconnected from the TN 102.

As shown in FIG. 11, during the CCD initialization, the program code instructions cause the CPU 206 to initialize all internal flags of the CCD 200 (S11). After the initialization of the internal flags of the above S11 is performed, the program code instructions cause the CPU 206 to set the relay 201 in the on-state so that the TU 101 is connected to the TN 102 through the relay 201 (S12). In this case, the relay 201 switches on the connection line between the TU 101 and the TN 102 so as to connect the TU 101 to the TN 102 through the relay 201. After the setting of the relay 201 of the above S12 is performed, the CCD initialization of FIG. 11 is finished.

As shown in FIG. 10, during the PC interface initialization, the program code instructions cause the CPU 206 to set a status portion of the memory of the CCD 200 at a predetermined value (S21). After the setting of the status portion of the above S21 is performed, the program code instructions cause the CPU 206 to set a data portion of the memory of the CCD 200 at "00" (S22). After the setting of the data portion of the above S22 is performed, the program code instructions cause the CPU 206 to set a data strobe signal in an on-state (S23). After a given time period, the program code instructions cause the CPU 206 to set the data strobe signal in an off-state (S23). In this case, setting the status portion at the predetermined value indicates that data is currently included in the data portion of the memory. After the setting of the data strobe signal of the above S23 is performed, the PC interface initialization of FIG. 10 is finished.

During the main routine of FIG. 9, the CPU 206 of the CCD 200 simultaneously executes an interrupt processing routine in response to an interrupt signal. In the communication support system of the present embodiment, the interrupt signal is supplied to the CPU 206 by either the DPD 300 or the CCD 200. In the CCD 200, the DTMF detection unit 203, the off-hook detection unit 204, or the signal detection unit 205 supplies a detection signal to the CPU 206 as the interrupt signal.

Figure 20:
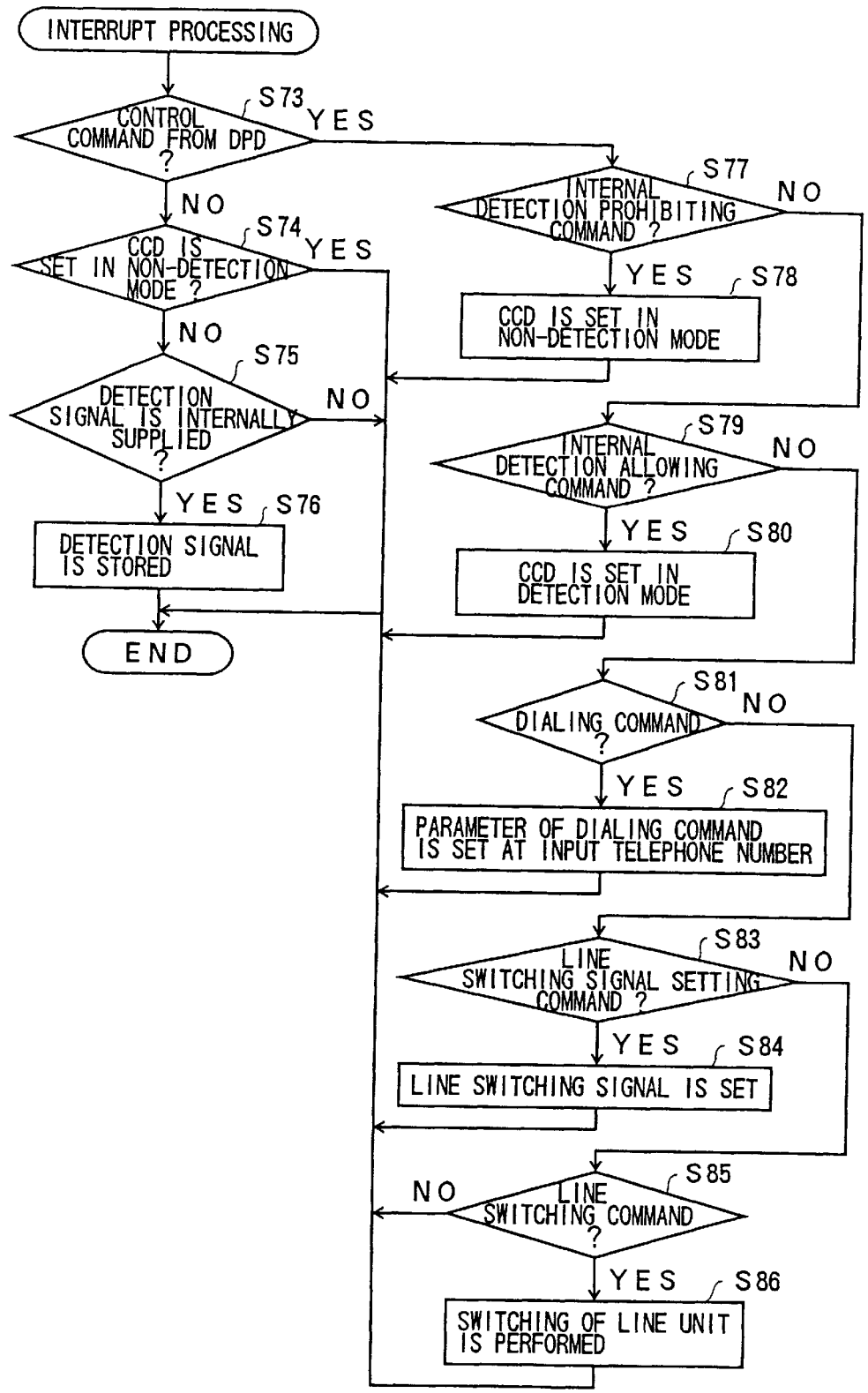
FIG. 20 is a flowchart for explaining an interrupt processing executed by the CPU of the communication control device of FIG. 8.
Figure 21:
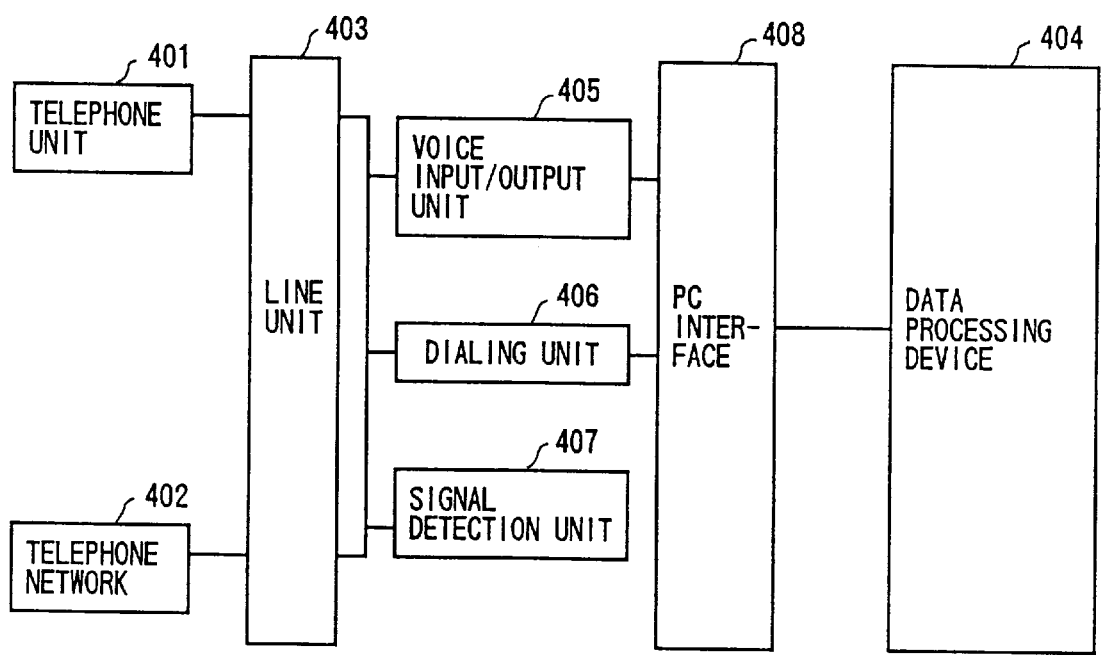
FIG. 21 is a block diagram of a conventional communication support system.

FIG. 20 shows the interrupt processing routine executed by the CPU 206 of the CCD 200.

As shown in FIG. 20, when an interrupt signal is received by the CPU 206, the program code instructions cause the CPU 206 to determine whether the interrupt has occurred due to a control command sent by the DPD 300 (S73).

When the interrupt has occurred due to the control command from the DPD 300 (the result of the above S73 is affirmative), the program code instructions cause the CPU 206 to determine whether the control command sent by the DPD 300 is an internal detection prohibiting command (S77). When the result of the above S77 is affirmative, the program code instructions cause the CPU 206 to set the CCD 200 in a non-detection mode (S78). When the CCD 200 is set in the non-detection mode, the DTMF detection unit 203, the off-hook detection unit 204 and the signal detection unit 205 are prohibited from detecting the content of the signal sent by the TU 101. After the setting of the CCD 200 of the above S78 is performed, the interrupt processing routine of FIG. 20 is finished.

When the control command sent by the DPD 300 is not the internal detection prohibiting command (the result of the above S77 is negative), the program code instructions cause the CPU 206 to determine whether the control command sent by the DPD 300 is an internal detection allowing command (S79). When the result of the above S79 is affirmative, the program code instructions cause the CPU 206 to set the CCD 200 in a detection mode (S80). When the CCD 200 is set in the detection mode, the DTMF detection unit 203, the off-hook detection unit 204 and the signal detection unit 205 are allowed to detect the content of the signal sent by the TU 101. The CCD 200 is initially set in the detection mode. After the setting of the CCD 200 of the above S80 is performed, the interrupt processing routine of FIG. 20 is finished.

When the control command sent by the DPD 300 is neither the internal detection prohibiting command nor the internal detection allowing command (both the results of the above S77 and S79 are negative), the program code instructions cause the CPU 206 to determine whether the control command is a dialing command (S81). When the result of the above S81 is affirmative, the program code instructions cause the CPU 206 to set a parameter of the dialing command at the pronounced calling LD and store the parameter of the dialing command in the memory of the CCD 200 (S82). After the setting of the dialing command of the above S82 is performed, the interrupt processing routine of FIG. 20 is finished.

When the control command sent by the DPD 300 is not a dialing command, the program code instructions cause the CPU 206 to determine whether the control command is a line switching signal setting command (S83). When the result of the above S83 is affirmative, the program code instructions cause the CPU 206 to set the line switching signal (S84). After the setting of the line switching signal of the above S84 is performed, the interrupt processing routine of FIG. 20 is finished.

When the control command sent by the DPD 300 is not a line switching signal setting command, the program code instructions cause the CPU 206 to determine whether the control command is a line switching command (S85). When the result of the above S85 is affirmative, the program code instructions cause the CPU 206 to perform a switching of the line unit 202 (S86). After the switching of the line unit 202 of the above S86 is performed, the interrupt processing routine of FIG. 20 is finished. When the result of the above S85 is negative, the interrupt processing routine of FIG. 20 is finished and the switching of the line unit 202 of the above S85 is not performed.

When the interrupt has occurred due to a signal other than the control command sent by the DPD 300 (the result of the above S73 is negative), the program code instructions cause the CPU 206 to detect whether the CCD 200 is set in the non-detection mode (S74). The CCD 200 is normally set in the detection mode, and the result of the above S74 is negative. In such a case, the program code instructions cause the CPU 206 to detect whether a detection signal is internally supplied from the DTMF detection unit 203, the off-hook detection unit 204 or the signal detection unit 205 (S75).

When the result of the above S74 is affirmative, or when the result of the above S75 is negative, the interrupt processing routine of FIG. 20 is finished.

When a detection signal is internally supplied from the DTMF detection unit 203, the off-hook detection unit 204 or the signal detection unit 205 (the result of the above S75 is affirmative), the program code instructions cause the CPU 206 to store the detection signal in the memory of the CCD 200 (S76). In this case, when one of the on-hook signal, the ring signal, the ring-back-tone signal and the busy-tone signal, which is sent by the TU 101, is detected by the signal detection unit 205, the detection signal is supplied to the CPU 206. Alternatively, when the off-hook signal sent by the TU 101 is detected by the off-hook detection unit 204, or when the DTMF signal sent by the TU 101 is detected by the DTMF detection unit 203, the detection signal is supplied to the CPU 206. After storing of the detection signal of the above S76 is performed, the interrupt processing routine of FIG. 20 is finished.

Figure 12A:
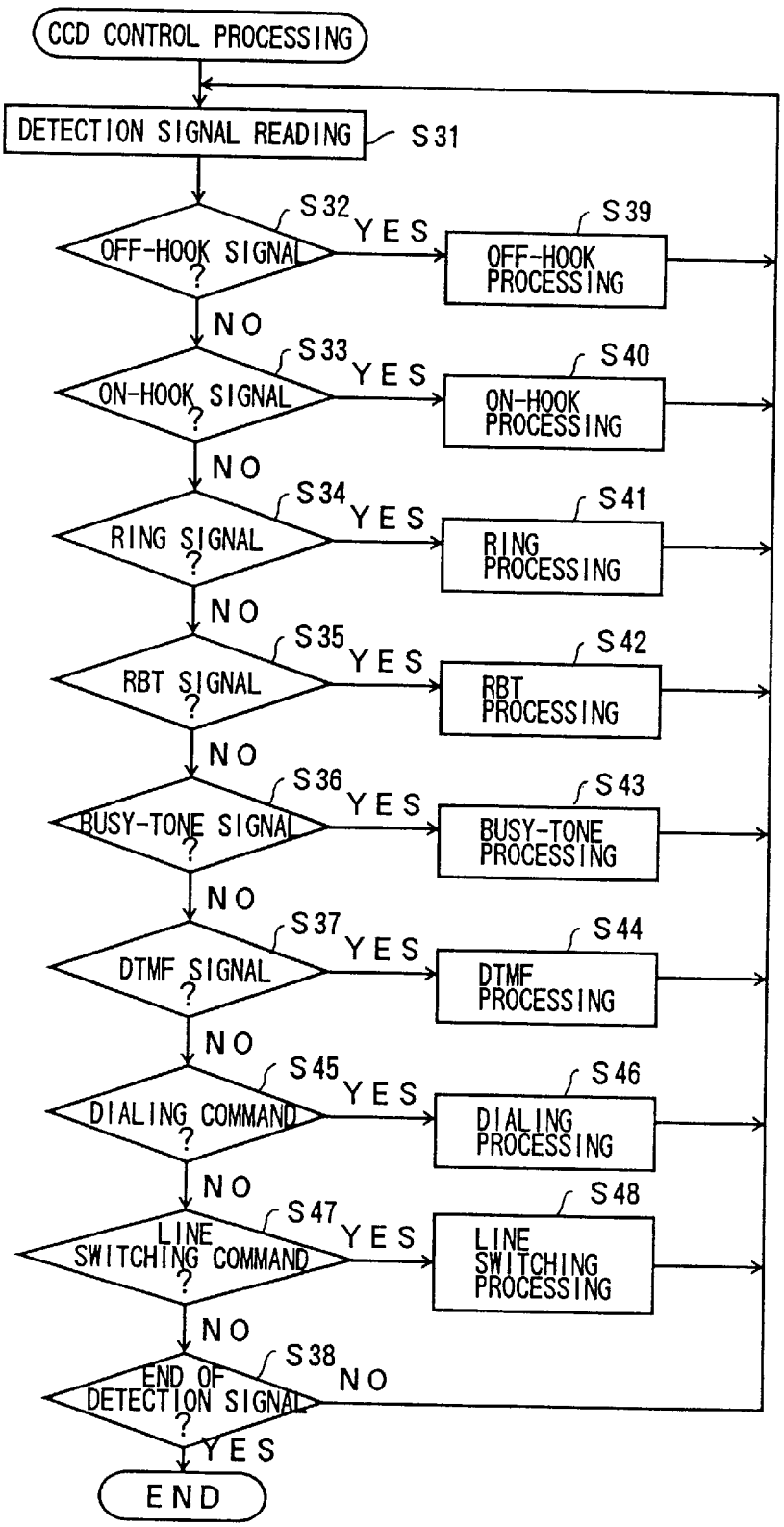
FIG. 12A is a flowchart for explaining a CCD control processing routine in the main routine of FIG. 9.

Next, FIG. 12A shows the CCD control processing routine S3 in the main routine of FIG. 9. As described above, after the PC interface initialization of FIG. 10 is performed, the program code instructions cause the CPU 206 to perform the CCD control processing routine S3 based on the signal sent by the TU 101.

When the off-hook signal from the TU 101 is detected by the off-hook detection unit 204 during the interrupt processing of FIG. 20, when the DTMF signal from the TU 101 is detected by the DTMF detection unit 203 during the interrupt processing of FIG. 20, or when one of the on-hook signal, the ring signal, the ring-back-tone signal and the busy-tone signal, sent from the TU 101, is detected by the signal detection unit 205, the program code instructions cause the CPU 206 to perform a detection signal reading (S31) as shown in FIG. 20.

Figure 19:
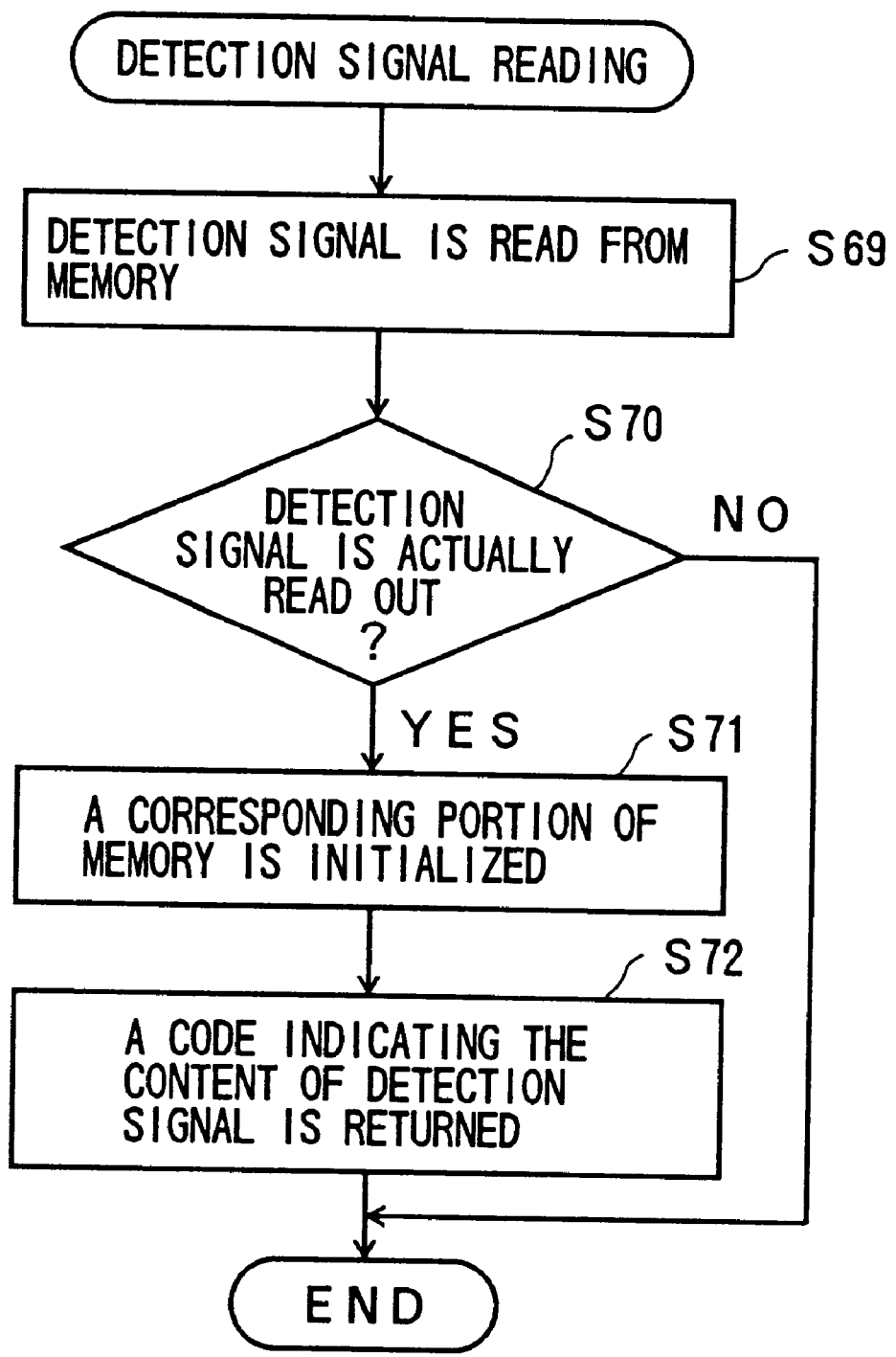
FIG. 19 is a flowchart for explaining a detection signal reading in the CCD control processing routine of FIG. 12A.

FIG. 19 shows the detection signal reading S31 in the CCD control processing routine of FIG. 12A.

As shown in FIG. 19, the program code instructions cause the CPU 206 to read the detection signal (which has been stored in the above S76 in the interrupt processing of FIG. 20) from the memory of the CCD 200 (S69). After the reading of the detection signal of the above S69 is performed, the program code instructions cause the CPU 206 to determine whether the detection signal (which is one of the telephone-condition signal, the DTMF signal, the dialing command and the line switching command) is actually read out from the memory of the CCD 200 (S70). When the result of the above S70 is negative, the detection signal reading of FIG. 19 is finished.

When the result of the above S70 is affirmative, the program code instructions cause the CPU 206 to initialize a corresponding portion of the memory of the CCD 200 in which the detection signal was stored during the interrupt processing of FIG. 20 (S71). The initialized portion of the memory of the CCD 200 indicates that no detection signal is currently set in the portion of the memory. After the initialization of the above S71 is performed, the program code instructions cause the CPU 206 to return a code indicating the content of the detection signal (or one of the telephone-condition signal, the DTMF signal, the dialing command and the line switching command) read out in the above S69 (S72). After return of the code of the above S72. is performed, the detection signal reading of FIG. 19 is finished.

Referring back to FIG. 12A, after the detection signal reading S31 is performed, the program code instructions cause the CPU 206 to determine which of the off-hook signal, the on-hook signal, the ring signal, the ring-back-tone ("IRBT") signal, the busy-tone signal, the DTMF signal, the dialing command and the line switching command is indicated by the return code obtained by the detection signal reading S31 (S32–S38, S45, S47 of FIG. 12A).

As shown in FIG. 12A, the program code instructions cause the CPU 206 to determine whether the off-hook signal is indicated by the return code (or whether it is detected by the signal detection unit 205) (S32). When the result of the above S32 is affirmative, the program code instructions cause the CPU 206 to perform an off-hook processing (S39).

Figure 13:
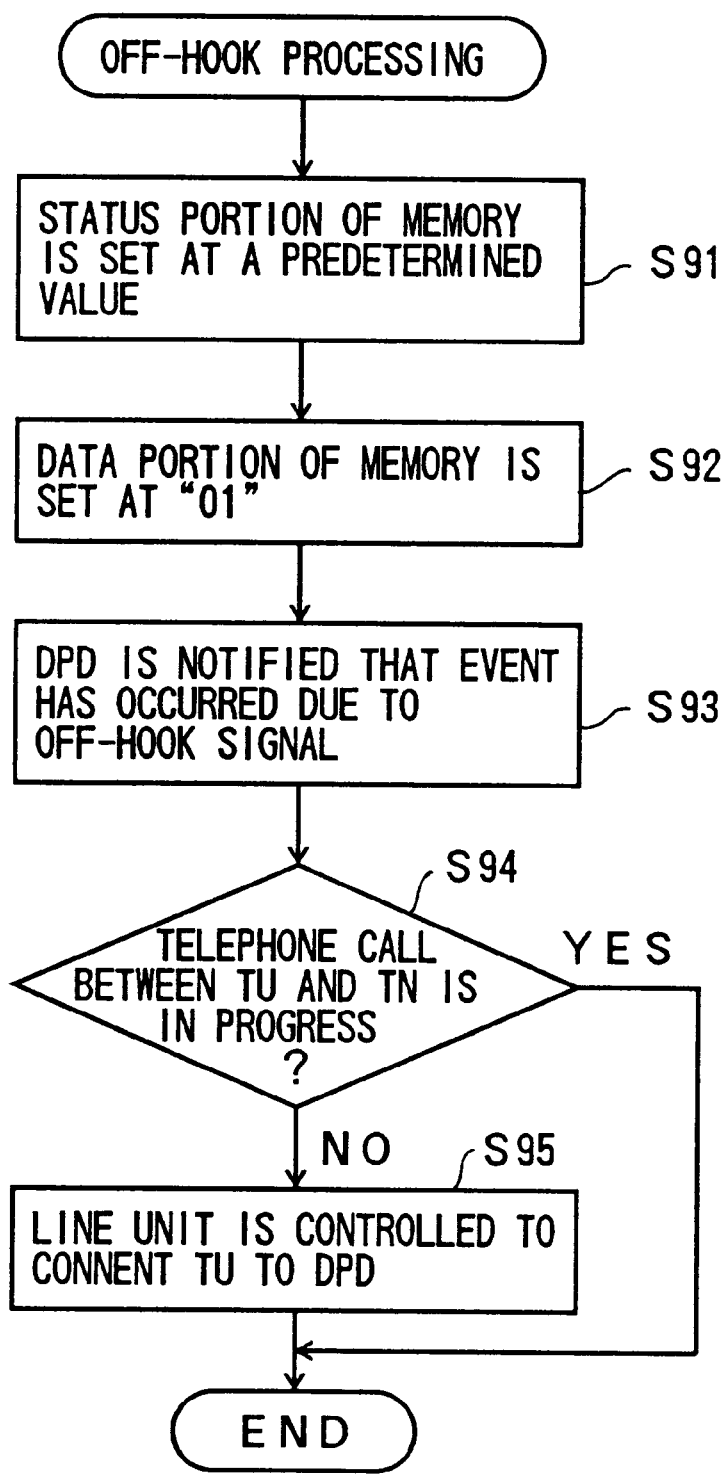
FIG. 13 is a flowchart for explaining an off-hook processing in the CCD control processing routine of FIG. 12A.

FIG. 13 shows the off-hook processing S39 in the CCD control processing routine of FIG. 12A.

As shown in FIG. 13, the program code instructions cause the CPU 206 to set the status portion of the memory of the CCD 200 at the predetermined value (S91). In this case, setting the status portion at the predetermined value indicates that data is currently included in the data portion of the memory. After the setting of the status portion of the above S91 is performed, the program code instructions cause the CPU 206 to set the data portion of the memory at "01" (S92). In this case, setting the data portion at "01" indicates that the off-hook signal is detected by the signal detection unit 205. After the setting of the data portion of the above S92 is performed, the program code instructions cause the CPU 206 to notify the DPD 300 that the event has occurred due to the off-hook signal from the TU 101 (S93).

After the notification of.the above S93 is performed, the program code instructions cause the CPU 206 to determine whether a telephone call between the TU 101 and the TN 102 is in progress (S94). When the telephone call is in progress (the result of the above S94 is affirmative), the off-hook processing of FIG. 13 is finished. When the telephone call is not in progress (the result of the above S94 is negative), the program code instructions cause the CPU 206 to control the line unit 202 so that the connection line from the TU 101 is connected to the V/I 301 of the DPD 300 via the line unit 202 (S95). This allows the voice command signal from the TU 101 to be transmitted to the V/I 301 of the DPD 300 via the CCD 200. As described above, the voice recognition unit (VRU) 303 can determine which of the telephone services is indicated by the voice command signal from the TU 101.

After the off-hook processing S39 is performed, the program code instructions cause the CPU 206 to perform again the above detection signal reading S31.

Referring back to FIG. 12A, the program code instructions cause the CPU 206 to determine whether the on-hook signal is indicated by the return code (or whether it is detected by the signal detection unit 205) (S33). When the result of the above S33 is affirmative, the program code instructions cause the CPU 206 to perform an on-hook processing (S40).

Figure 14:
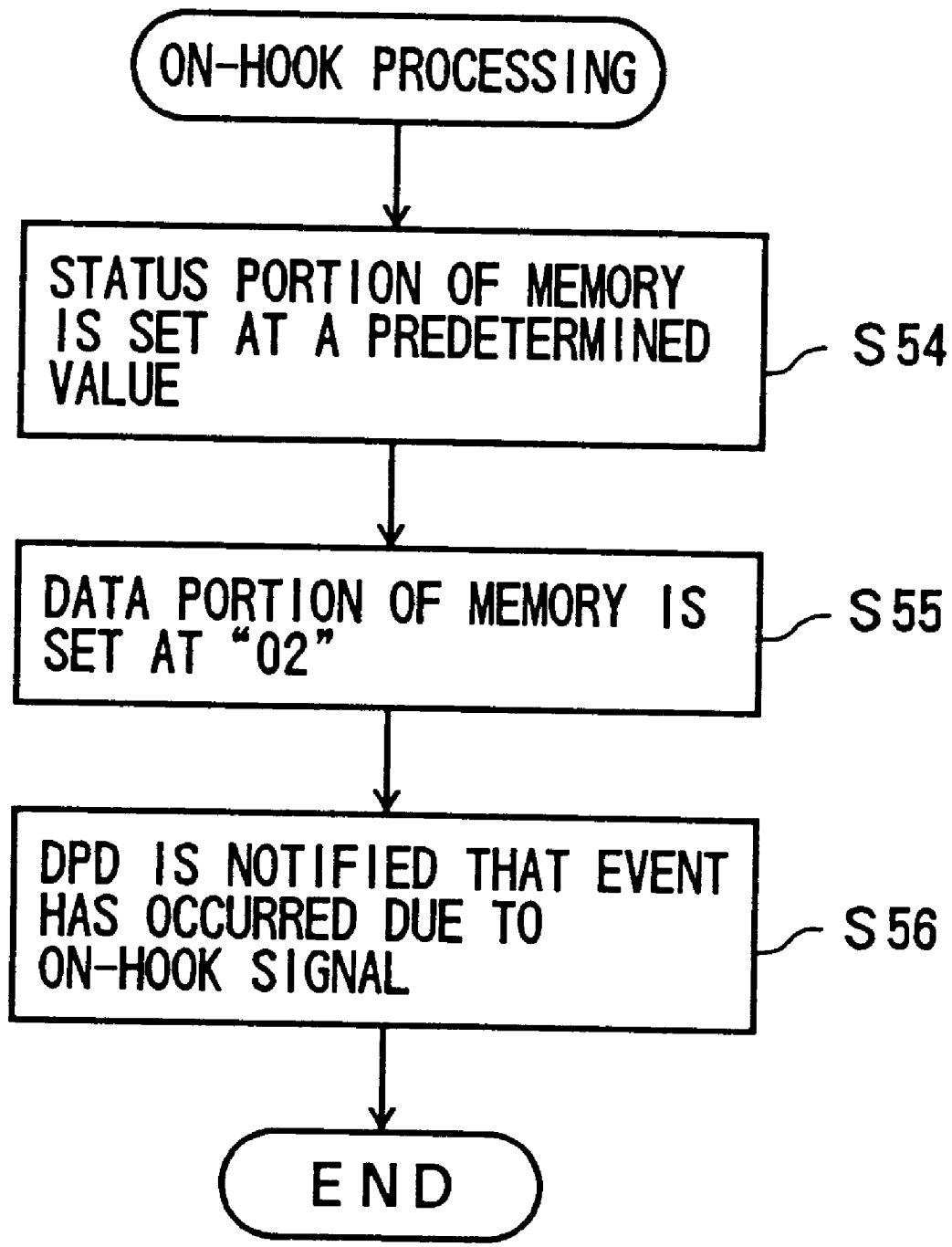
FIG. 14 is a flowchart for explaining an on-hook processing in the CCD control processing routine of FIG. 12A.

FIG. 14 shows the on-hook processing S40 in the CCD control processing routine of FIG. 12A.

As shown in FIG. 14, the program code instructions cause the CPU 206 to set the status portion of the memory of the CCD 200 at the predetermined value (S54). After the setting of the status portion of the above S51 is performed, the program code instructions cause the CPU 206 to set the data portion of the memory at "02" (S55). In this case, setting the data portion at "02" indicates that the on-hook signal is detected by the signal detection unit 205. After the setting of the data portion of the above S55 is performed, the program code instructions cause the CPU 206 to notify the DPD 300 that the event has occurred due to the on-hook signal from the TU 101 (S56). After the on-hook processing S40 is performed, the program code instructions cause the CPU 206 to perform again the above detection signal reading S31.

Referring back to FIG. 12A, the program code instructions cause the CPU 206 to determine whether the ring signal is indicated by the return code (or whether it is detected by the signal detection unit 205) (S34). When the result of the above S34 is affirmative, the program code instructions cause the CPU 206 to perform a ring processing (S41).

Figure 15:
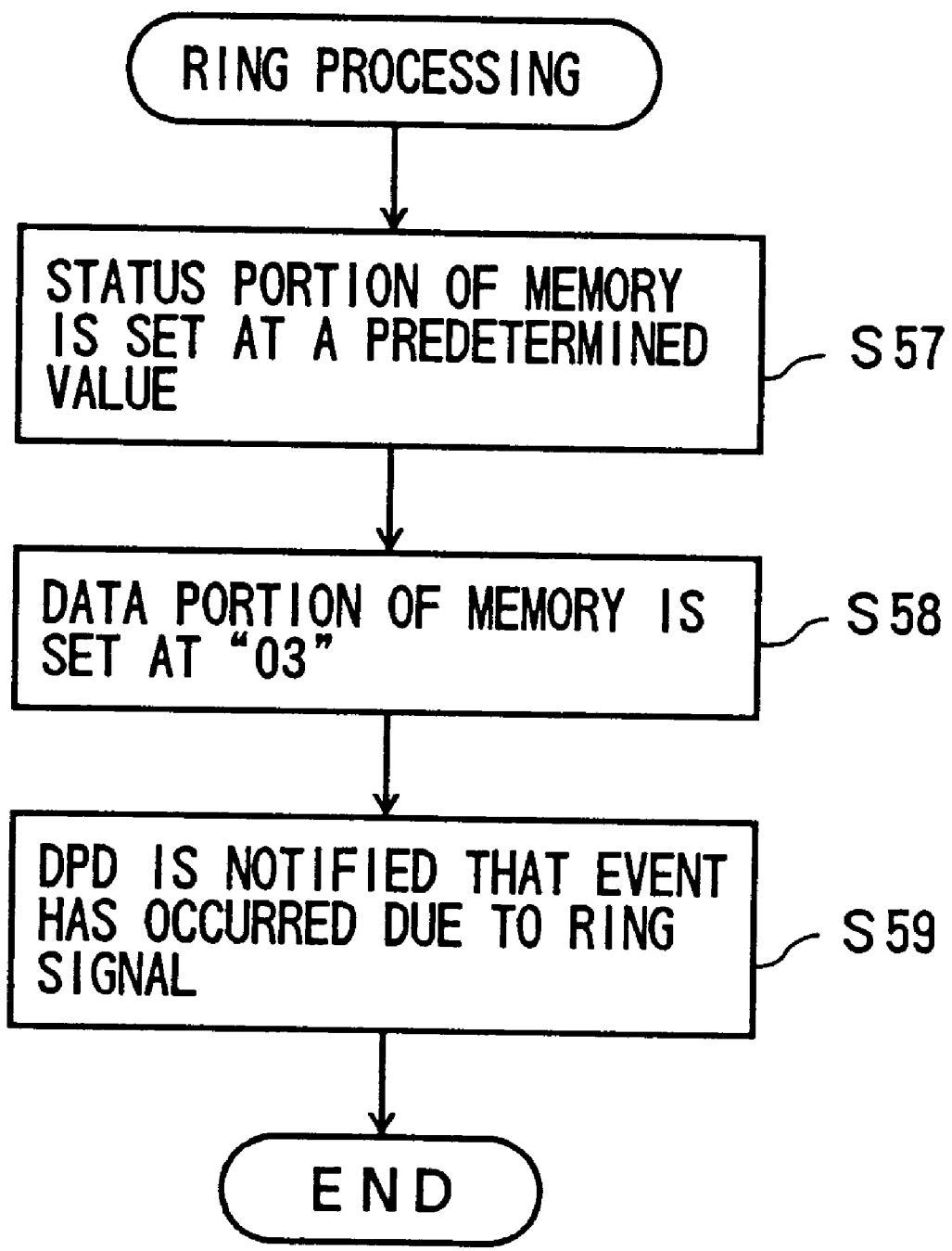
FIG. 15 is a flowchart for explaining a ring processing in the CCD control processing routine of FIG. 12A.

FIG. 15 shows the ring processing S41 in the CCD control processing routine of FIG. 12A.

As shown in FIG. 15, the program code instructions cause the CPU 206 to set the status portion of the memory of the CCD 200 at the predetermined value (S57). After the setting of the status portion of the above S57 is performed, the program code instructions cause the CPU 206 to set the data portion of the memory at "03" (S58). In this case, setting the data portion at "03" indicates that the ring signal is detected by the signal detection unit 205. After the setting of the data portion of the above S58 is performed, the program code instructions cause the CPU 206 to notify the DPD 300 that the event has occurred due to the ring signal from the TU 101 (S59). After the ring processing S41 is performed, the program code instructions cause the CPU 206 to perform again the above detection signal reading S31.

Referring back to FIG. 12A, the program code instructions cause the CPU 206 to determine whether the ring-back-tone (RBT) signal is indicated by the return code (or whether it is detected by the signal detection unit 205) (S35). When the result of the above S35 is affirmative, the program code instructions cause the CPU 206 to perform a ring-back-tone (RBT) processing (S42).

Figure 16:
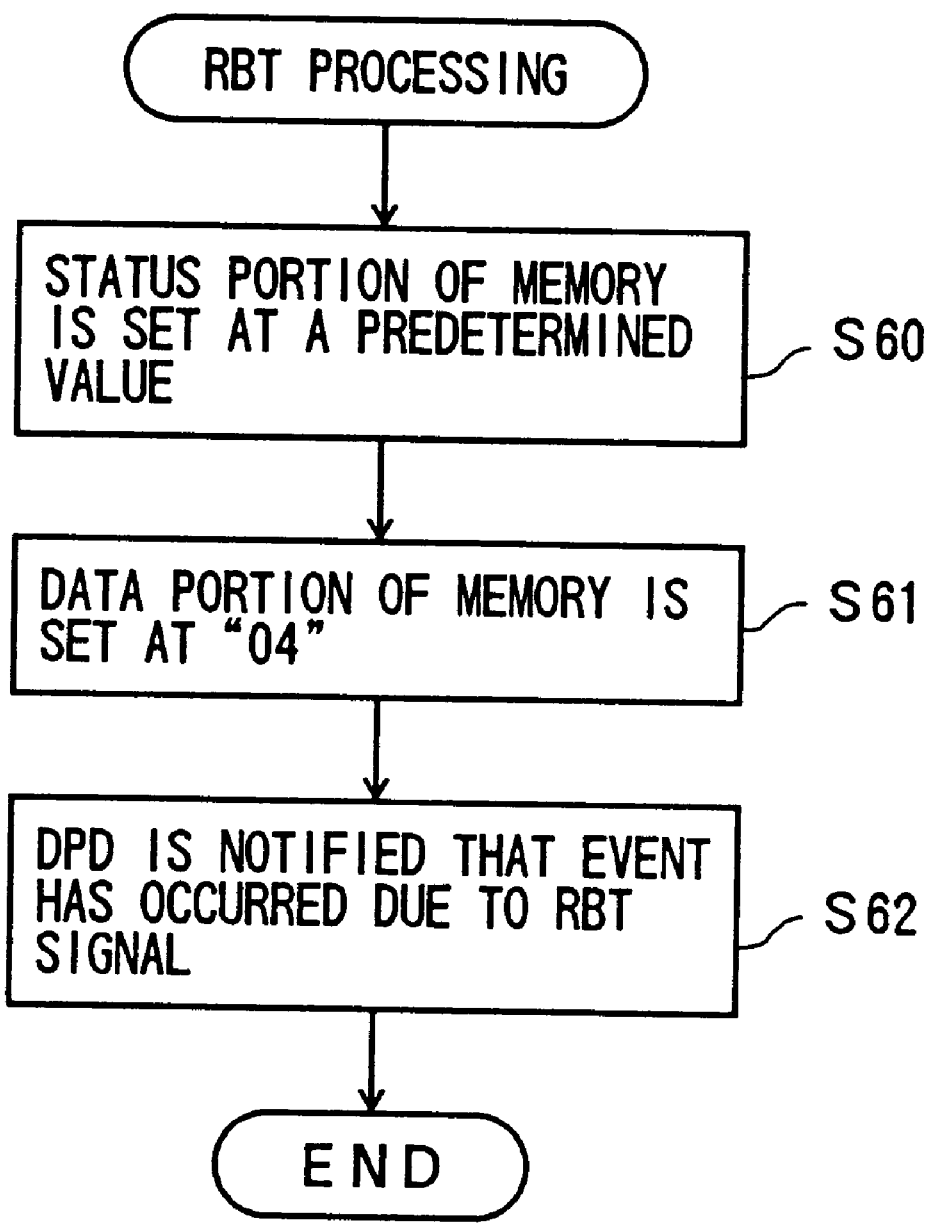
FIG. 16 is a flowchart for explaining a ring-back-tone processing in the CCD control processing routine of FIG. 12A.

FIG. 16 shows the ring-back-tone (RBT) processing S42 in the CCD control processing routine of FIG. 12A.

As shown in FIG. 16, the program code instructions cause the CPU 206 to set the status portion of the memory of the CCD 200 at the predetermined value (S60). After the setting of the status portion of the above S60 is performed, the program code instructions cause the CPU 206 to set the data portion of the memory at "04" (S61). In this case, setting the data portion at "04" indicates that the ring-back-tone signal is detected by the signal detection unit 205. After the setting of the data portion of the above S61 is performed, the program code instructions cause the CPU 206 to notify the DPD 300 that the event has occurred due to the ring-back-tone signal from the TU 101 (S62). After the RBT processing S42 is performed, the program code instructions cause the CPU 206 to perform again the above detection signal reading S31.

Referring back to FIG. 12A, the program code instructions cause the CPU 206 to determine whether the busy-tone signal is indicated by the return code (or whether it is detected by the signal detection unit 205) (S36). When the result of the above S36 is affirmative, the program code instructions cause the CPU 206 to perform a busy-tone processing (S43).

Figure 18:
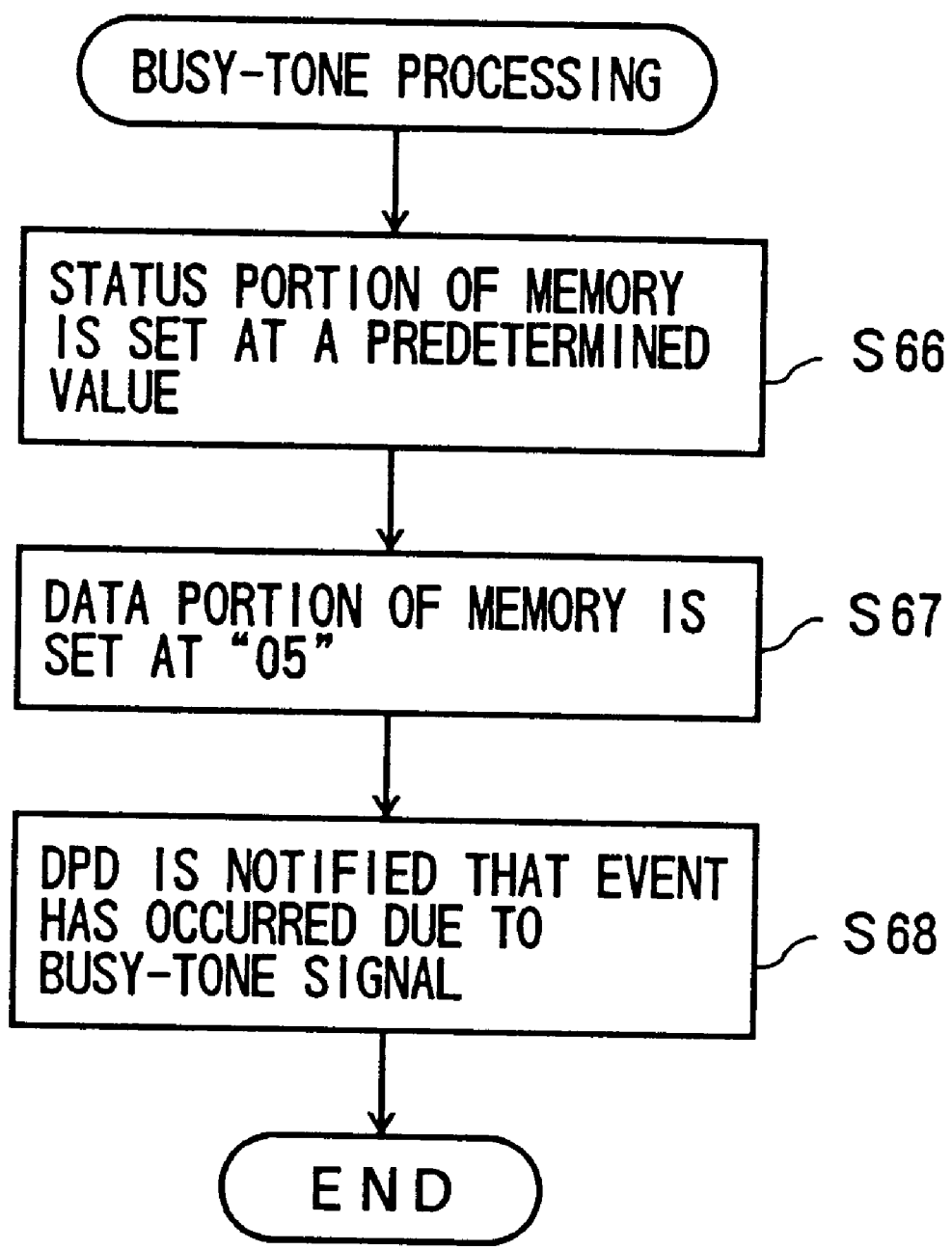
FIG. 18 is a flowchart for explaining a busy-tone processing in the CCD control processing routine of FIG. 12A.

FIG. 18 shows the busy-tone processing S43 in the CCD control processing routine of FIG. 12A.

As shown in FIG. 18, the program code instructions cause the CPU 206 to set the status portion of the memory of the CCD 200 at the predetermined value (S66). After the setting of the status portion of the above S66 is performed, the program code instructions cause the CPU 206 to set the data portion of the memory at "05" (S67). In this case, setting the data portion at "05" indicates that the busy-tone signal is detected by the signal detection unit 205. After the setting of the data portion of the above S67 is performed, the program code instructions cause the CPU 206 to notify the DPD 300 that the event has occurred due to the busy-tone signal from the TU 101 (S68). After the busy-tone processing S43 is performed, the program code instructions cause the CPU 206 to perform again the above detection signal reading S31.

Referring back to FIG. 12A, the program code instructions cause the CPU 206 to determine whether the DTMF signal is indicated by the return code (or whether it is detected by the DTMF detection unit 203) (S37). When the result of the above S37 is affirmative, the program code instructions cause the CPU 206 to perform a DTMF processing (S44).

Figure 17:
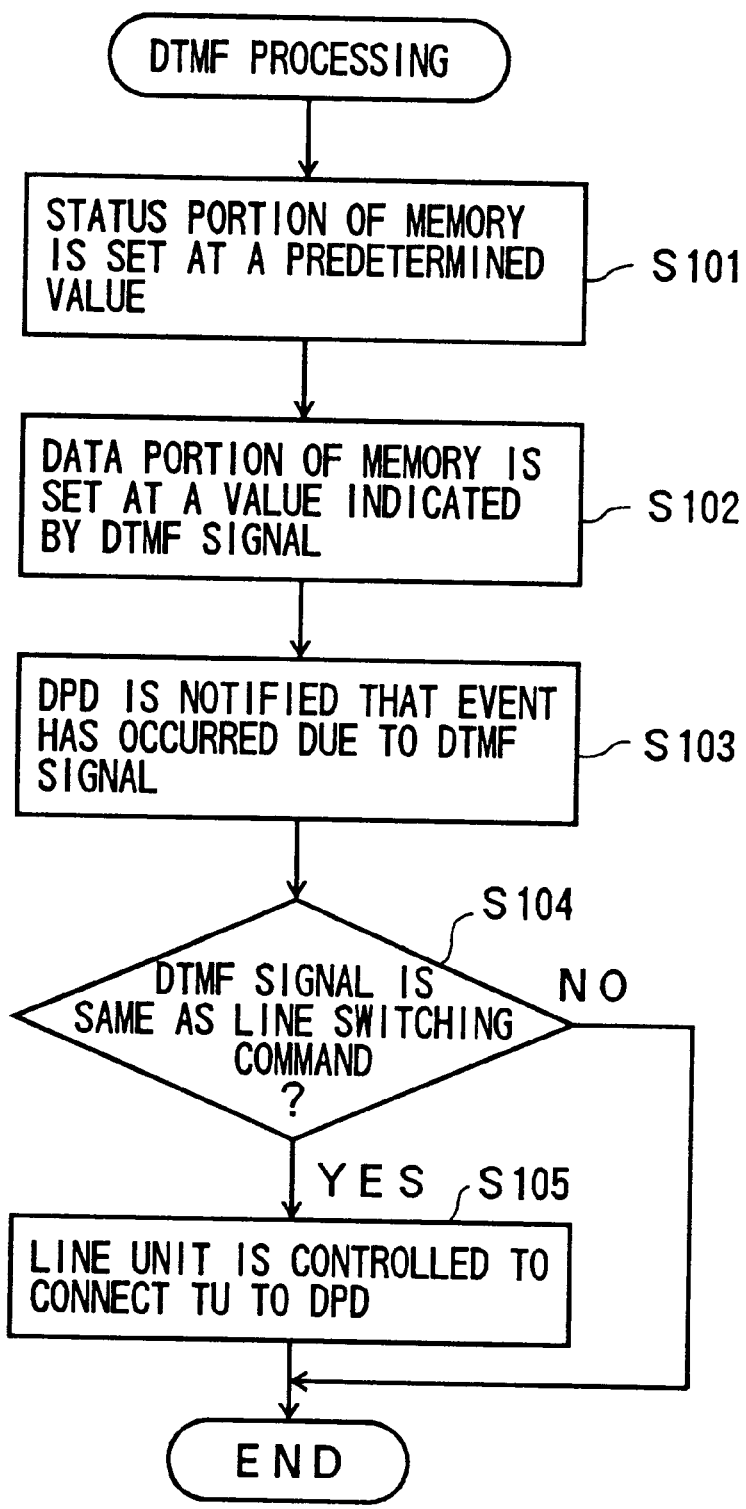
FIG. 17 is a flowchart for explaining a DTMF processing in the CCD control processing routine of FIG. 12A.

FIG. 17 shows the DTMF processing S44 in the CCD control processing routine of FIG. 12A.

As shown in FIG. 17, the program code instructions cause the CPU 206 to set the status portion of the memory of the CCD 200 at the predetermined value (S101). After the setting of the status portion of the above S101 is performed, the program code instructions cause the CPU 206 to set the data portion of the memory at a value indicated by the DTMF signal (S102). The data portion of the memory is set at, for example, "*1" as the value indicated by the DTMF signal. In this case, setting the data portion at the value of the DTMF signal means that the detection signal (the DTMF signal) is internally detected by the DTMF detection unit 203. After the setting of the data portion of the above S102 is performed, the program code instructions cause the CPU 206 to notify the DPD 300 that the event has occurred due to the DTMF signal from the TU 101 (S103).

After the notification of the above S103 is performed, the program code instructions cause the CPU 206 to determine whether the DTMF signal indicated by the return code is the same as the line switching command from the DPD 300 (S104). When the result of the above S104 is negative, the DTMF processing of FIG. 17 is finished. When the result of the above S104 is affirmative, the program code instructions cause the CPU 206 to control the line unit 202 so that the connection line from the TU 101 is connected to the V/I 301 of the DPD 300 via the line unit 202 (S105). This allows the voice command signal from the TU 101 to be transmitted to the V/I 301 of the DPD 300 via the CCD 200. As described above, the voice recognition unit (VRU) 303 can determine which of the telephone services is indicated by the voice command signal from the TU 101.

After the DTMF processing S44 is performed, the program code instructions cause the CPU 206 to perform again the above detection signal reading S31.

Referring back to FIG. 12A, the program code instructions cause the CPU 206 to determine whether the dialing command is indicated by the return code (S45). When the result of the above S45 is affirmative, the program code instructions cause the CPU 206 to perform a dialing processing (S46).

Figure 12B:
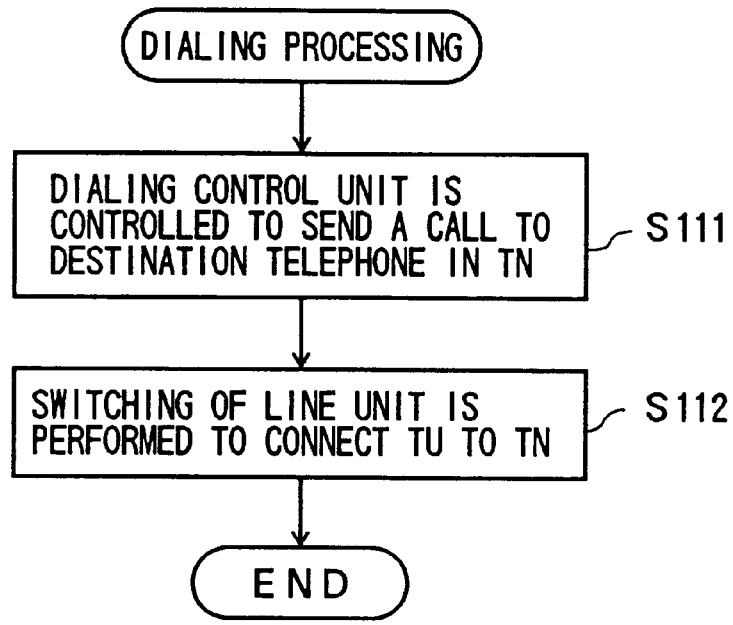
FIG. 12B is a flowchart for explaining a dialing processing in the CCD control processing routine of FIG. 12A.

FIG. 12B shows the dialing processing S46 in the CCD control processing routine of FIG. 12A.

As shown in FIG. 12B, the program code instructions cause the CPU 206 to control the telephone service processing unit (TSP) 304 to execute the dialing processing so that the dialing control unit 209 is controlled to send a call to the destination telephone in the TN 102 in accordance with the dialing command and the pronounced calling ID (stored in the above S82 of FIG. 20) (S111). After the dialing processing of the dial control unit 209 of the above S111 is performed, the program code instructions cause the CPU 206 to perform a switching of the line unit 202 so that the connection line from the TU 101 is connected to the TN 102 (S112). After the switching of the line unit 202 of the above S112 is performed, the dialing processing of FIG. 12B is finished.

After the dialing processing S46 is performed, the program code instructions cause the CPU 206 to perform again the above detection signal reading S31.

Referring back to.FIG. 12A, the program code instructions cause the CPU 206 to determine whether the line switching command is indicated by the return code (S47). When the result of the above S47 is affirmative, the program code instructions cause the CPU 206 to perform a line switching processing (S48).

Figure 12C:
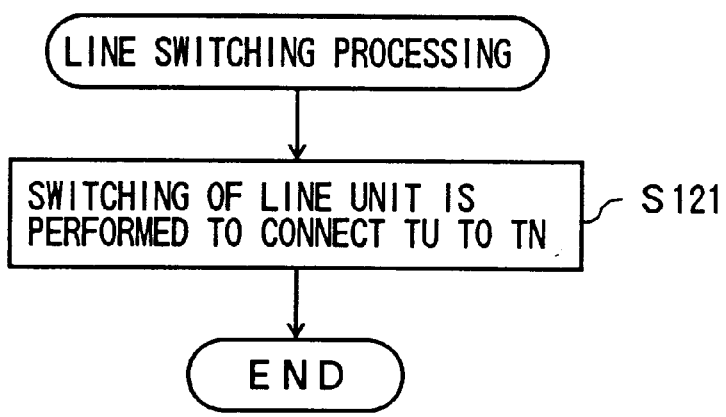
FIG. 12C is a flowchart for explaining a line switching processing in the CCD control processing routine of FIG. 12A.

FIG. 12C shows the line switching processing S48 in the CCD control processing routine of FIG. 12A.

As shown in FIG. 12C, the program code instructions cause the CPU 206 to perform a switching of the line unit 202 so that the connection line from the TU 101 is connected to the TN 102 (S121). After the switching of the line unit 202 of the above S121 is performed, the line switching processing of FIG. 12C is finished.

After the line switching processing S48 is performed, the program code instructions cause the CPU 206 to perform again the above detection signal reading S31.

Referring back to FIG. 12A, the program code instructions cause the CPU 206 to determine whether the end of the detection signal is indicated by the return code (S38). That is, it is determined in this step whether all the detection signals obtained by the above detection signal reading S31 have been detected. When the result of the above S38 is affirmative, the CCD control processing routine of FIG. 12A is finished. When the result of the above S38 is negative, the program code instructions cause the CPU 206 to perform again the above detection signal reading S31.

In the communication support system of FIG. 8, when the telephone service processing program of FIGS. 9–20 is executed by the CPU 206 of the CCD 200, the data processing device (DPD) 300 executes the dialing processing based on the telephone condition of the TU 101 and executes the telephone service processing for one of the telephone services of FIG. 2 based on the DTMF signal and the voice command signal from the TU 101.

Further, the present invention is not limited to the above-described embodiments, and variations and modifications may be made without departing from the present invention.

What is claimed is:

1. A communication support system in which a telephone unit is connected through a communication control device to a data processing device, the communication control device being connected to a telephone network, comprising:

a predetermined signal detection unit for detecting a predetermined signal sent by the telephone unit when a telephone call between the telephone unit and the telephone network is in progress;

a telephone condition detection unit for detecting a condition of the telephone unit;

a line unit for disconnecting the telephone unit from the telephone network and connecting the telephone unit to the data processing device when the predetermined signal is detected by the predetermined signal detection unit;

a voice recognition unit for determining which of a plurality of telephone services is indicated by a voice command signal sent by the telephone unit when the telephone unit is disconnected from the telephone network and connected to the data processing device by the line unit; and a telephone service processing unit for executing a telephone service processing for the telephone service determined by the voice recognition unit, the telephone service processing unit starting execution of the telephone service processing in response to control data sent by the voice recognition unit.

2. The communication support system according to claim 1, wherein the communication control device comprises a communication unit for sending a call to a destination telephone in the telephone network in accordance with a dialing command from the data processing device and a pronounced calling ID from the telephone unit when the telephone call is not in progress and an off-hook condition of the telephone unit is detected.

3. The communication support system according to claim 1, wherein the predetermined signal detection unit detects one of a predetermined dual-tone multiple frequency signal and a predetermined dial-pulse signal as the predetermined signal sent by the telephone unit.

4. The communication support system according to claim 1, wherein the telephone condition detection unit detects an off-hook condition of the telephone unit when the telephone call is not in progress.

5. The communication support system according to claim 4, wherein the line unit connects the telephone unit to the data processing device when the off-hook condition of the telephone unit is detected by the telephone condition detection unit.

6. The communication support system according to claim 1, wherein the data processing device comprises a voice command database for providing a plurality of voice commands related to the plurality of telephone services for the voice recognition unit, and, when the voice command signal from the telephone unit corresponds to one of the plurality of voice commands from the voice command database, the voice recognition unit determining a corresponding telephone service for the voice command signal.

7. The communication support system according to claim 1, wherein the telephone service processing unit executes one of a dialing processing, a voice recording processing, a voice playback processing, a file transmission processing and a telephone number entry processing based on the telephone service determined by the voice recognition unit.

8. A communication control device for a communication support system including a telephone unit and a data processing device wherein the telephone unit is connected through the communication control device to a telephone network and the communication control device is connected to the telephone network, comprising:

a predetermined signal detection unit for detecting a predetermined signal sent by the telephone unit when a telephone call between the telephone unit and the telephone network is in progress;

a telephone condition detection unit for detecting a condition of the telephone unit; and a line unit for disconnecting the telephone unit from the telephone network and connecting the telephone unit to the data processing device when the predetermined signal is detected by the predetermined signal detection unit, wherein a voice command signal sent by the telephone unit when the telephone unit is disconnected from the telephone network and connected to the data processing device is transmitted to the data processing device through the line unit, so that the data processing device executes a telephone service processing for a telephone service indicated by the voice command signal.

9. The communication control device according to claim 8, further comprising a dialing control unit for sending a call to a destination telephone in the telephone network in accordance with a dialing command from the data processing device and a pronounced calling ID from the telephone unit when the telephone call is not in progress and an off-hook condition of the telephone unit is detected.

10. The communication control device according to claim 8, wherein the predetermined signal detection unit detects one of a predetermined dual-tone multiple frequency signal and a predetermined dial-pulse signal as the predetermined signal sent by the telephone unit.

11. The communication control device according to claim 8, further comprising an off-hook detection unit for detecting an off-hook condition of the telephone unit when the telephone call is not in progress, wherein the line unit connects the telephone unit to the data processing device when the off-hook condition of the telephone unit is detected by the off-hook detection unit.

12. A method of executing a telephone service processing in a communication support system wherein a telephone unit is connected through a communication control device to a data processing device and the communication control device is connected to a telephone network, the method comprising the steps of:

detecting a predetermined signal sent by the telephone unit when a telephone call between the telephone unit and the telephone network is in progress;

detecting a condition of the telephone unit;

disconnecting the telephone unit from the telephone network and connecting the telephone unit to the data processing device when the predetermined signal is detected;

determining which of a plurality of telephone services is indicated by a voice command signal sent by the telephone unit when the telephone unit is disconnected from the telephone network and connected to the data processing device; and executing a telephone service processing for the telephone service determined in said determining step in the data processing device.

13. A computer readable medium storing program code for causing a processor to execute a telephone service processing in a communication support system wherein a telephone unit is connected through a communication control device to a data processing device and the communication control device is connected to a telephone network, comprising:

first program code means for causing the processor to detect a predetermined signal sent by the telephone unit when a telephone call between the telephone unit and the telephone network is in progress;

second program code means for causing the processor to detect a condition of the telephone unit;

third program code means for causing the processor to disconnect the telephone unit from the telephone network and connect the telephone unit to the data processing device when the predetermined signal is detected;

fourth program code means for causing the processor to determine which of a plurality of telephone services is indicated by a voice command signal sent by the telephone unit when the telephone unit is disconnected from the telephone network and connected to the data processing device; and fifth program code means for causing the processor to execute a telephone service processing for the telephone service determined by said fourth program code means.

14. The computer readable medium according to claim 13, further comprising sixth program code means for causing the processor to perform a dialing processing to send a call to a destination telephone in the telephone network in accordance with a dialing command from the data processing device and a pronounced calling ID from the telephone unit when the telephone call is not in progress and an off-hook condition of the telephone unit is detected.

15. The computer readable medium according to claim 13, further comprising:

seventh program code means for causing the processor to detect an off-hook condition of the telephone unit when the telephone call is not in progress; and eighth program code means for causing the processor to perform an off-hook processing to connect the telephone unit to the data processing device when the off-hook condition of the telephone unit is detected.

* * * * *